(12) United States Patent
So

(10) Patent No.: US 12,114,253 B2
(45) Date of Patent: Oct. 8, 2024

(54) NETWORK SLICING SERVING FUNCTION

(71) Applicant: ZTE Corporation, Shenzhen (CN)

(72) Inventor: Tricci So, Oceanside, CA (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/451,901

(22) Filed: Oct. 22, 2021

(65) Prior Publication Data

US 2022/0046531 A1 Feb. 10, 2022

Related U.S. Application Data

(60) Division of application No. 16/577,548, filed on Sep. 20, 2019, now Pat. No. 11,184,841, which is a continuation of application No. PCT/US2018/023435, filed on Mar. 20, 2018.

(60) Provisional application No. 62/473,760, filed on Mar. 20, 2017.

(51) Int. Cl.
| | |
|---|---|
| *H04W 48/18* | (2009.01) |
| *H04L 67/568* | (2022.01) |
| *H04W 8/08* | (2009.01) |
| *H04W 8/20* | (2009.01) |
| *H04W 48/16* | (2009.01) |
| *H04W 60/00* | (2009.01) |

(52) U.S. Cl.
CPC ............ *H04W 48/18* (2013.01); *H04W 8/08* (2013.01); *H04W 8/20* (2013.01); *H04W 48/16* (2013.01); *H04W 60/00* (2013.01); *H04L 67/568* (2022.05)

(58) Field of Classification Search
CPC ....... H04W 48/18; H04W 8/08; H04W 48/16; H04W 60/00; H04W 8/20; H04L 67/2842
See application file for complete search history.

(56) References Cited

U.S. PATENT DOCUMENTS

| | | | |
|---|---|---|---|
| 9,043,879 B1 | 5/2015 | Reeves | |
| 10,841,084 B2 * | 11/2020 | Lee | ................. H04L 63/102 |
| 2014/0133460 A1 | 5/2014 | Li | |
| 2016/0337953 A1 | 11/2016 | Ji | |
| 2018/0192471 A1 * | 7/2018 | Li | ................... H04W 16/04 |
| 2018/0199240 A1 * | 7/2018 | Dao | ................. H04L 65/1069 |
| 2018/0227302 A1 * | 8/2018 | Lee | ................... H04L 9/3273 |
| 2018/0270666 A1 * | 9/2018 | Lee | ................. H04W 12/084 |
| 2018/0270877 A1 * | 9/2018 | Lee | ................... H04W 76/20 |
| 2019/0174573 A1 * | 6/2019 | Velev | ................. H04W 80/10 |

(Continued)

FOREIGN PATENT DOCUMENTS

| | | |
|---|---|---|
| CN | 101553021 A1 | 10/2009 |
| RU | 2452136 | 5/2012 |

OTHER PUBLICATIONS

3GPP TR 23.799 V14.0.0, '3GPP; TSGS and SA; Study on Architecture for Next Generation System (Rel. 14)', Dec. 2016.

(Continued)

*Primary Examiner* — Parth Patel
(74) *Attorney, Agent, or Firm* — Perkins Coie LLP

(57) ABSTRACT

Techniques for implementing a network slice selection function are described. In one example aspect, a network slice instance request message is received for a user device. In response, the network slice selection function transmits a response message that includes information about allowed network slice instances for the user device. The allowed network slice instances include network slice instances that are available in the registration area of the user device.

17 Claims, 19 Drawing Sheets

(56) References Cited

U.S. PATENT DOCUMENTS

| | | | |
|---|---|---|---|
| 2019/0268422 A1* | 8/2019 | Yu | H04W 76/10 |
| 2019/0274072 A1* | 9/2019 | Prasad | H04W 12/0431 |
| 2019/0373461 A1* | 12/2019 | Ito | H04W 12/106 |
| 2019/0387440 A1* | 12/2019 | Yiu | H04W 36/165 |
| 2020/0267638 A1* | 8/2020 | Ni | H04L 63/0876 |
| 2020/0267781 A1* | 8/2020 | Lee | H04W 72/20 |
| 2020/0367148 A1* | 11/2020 | Baek | H04W 48/18 |

OTHER PUBLICATIONS

3GPP TS 23.501, '3rd Generation Partnership Project; Technical Specification Group Services and System Aspects; System Architecture for the 5G System; Stage 2 (Release 15)', V 15.0.0; published in Dec. 2017.

EPO, extended European Search Report with Written Opinion for EP Application No. 18770806, Jun. 25, 2020.

EPO, Supplementary Partial European Search Report for EP Application No. 18770806, Feb. 6, 2020.

Ericsson, 'Signalling aspects of network slicing', R2-1701051, 3GPP TSG-RANWG2 #97, Athens, Greece, Feb. 3, 2017.

Huawei et al, "Network Slice instance selection", 3GPP Draft; 52-175296, 3rd Generation Partnership Project (3GPP), vol. SA WG2, No. Cabo, Mexico; Jun. 26-30, 2017 (URL:http://www.3gpp.org/ftp/tsg sa/WG2 Arch/TSGS2 122 Cabo/Docs/).

Huawei et al., 'RRC Support for Network Slicing', R2-1701216, 3GPP TSG-RANWG2#97, Athens, Greece, Feb. 4, 2017.

Huawei, "3GPP TSG-RAN WG3 AH R3-17023", Jan. 19, 2017.

Huawei: "TP for CN entity Selection for Slicing", 3GPP Draft; vol. RAN WG3, No. Spokane, Wa; Jan. 17-19, 2017, xx pages. (URL:http://www.3gpp.org/ftp/Meetings 3GPP SYNC/RAN3/Docs).

International Search Report and Written Opinion for International Patent Application No. PCT/US18/23435, mailed Jul. 6, 2018 (16 pages).

IP Office Australia, Examination Report No. 1 for Australian Application No. 2018240192, Aug. 25, 2020.

IP Office Australia, Examination Report No. 2 for Australian Application No. 2018240192, Aug. 10, 2021.

IP Office Australia, Examination Report No. 3 for Australian Application No. 2018240192, Aug. 18, 2021.

IP Office China, First Office Action for Chinese Application No. 201880033476.1, Oct. 10, 2020.

IP Office Korea, Office Action (lack of unity) for Korean Application No. 10-2019-7030483, Jul. 28, 2020.

IP Office Russia, Office Action and Search Results for Russian Application No. 2019133122, with English translation, Jun. 5, 2020.

Samsung, 'Registration Procedure Update Considering Network Slicing', SA WG2 Meeting #119, Feb. 13-17, 2017 Dubrovnik, Croatia. Document No. S2-171152.

Samsung: "Single value of NSSAI in RRC 1-6,9-13 for CCNF(AMF) selection", 3GPP Draft; S2-171153 Single Value of NSSAI in RRC for CONF(AMF) Selection, 3rd Generation Partnership Project (3GPP), vol. SA WG2, No. Dubrovnik, Croatia; Feb. 13-17, 2017 (URL:http://www.3gpp.org/ftp/tsg sa/WG2 Arc h/TSGS2 119 Dubrovnik/Docs/).

ZTE et al, "23.501 P-CR: Network Slicing Update for supporting standalone NSSF plus miscellaneous changes to the existing text", 3GPP Draft; S2-173362 23.501 Clause 5.15 Update With NSSF, 3rd Generation Partnership Project (3GPP), vol. SA WG2, No. Hangzhou, China; May 15-19, 2017; URL:http://www.3gpp.org/ftp/Meetings_ 3GPP_SYNC/SA2/Docs/).

ZTE, Oracle, ETRI, Telecom Italia, KDDI "Network Slicing Architecture Alignment for the Support of Standalone Network Slice Selection Function (NSSF)," SA WG2 Meeting #119, S2-171027, Dubrovnik, Croatia, Feb. 13-17, 2017, 11 pages.

ZTE, Oracle, ETRI, Telecom Italia, KDDI "Proposed architecture alignments of Network Slicing Conclusion with 5G Core Overall Architecture in TS 23.501," SA WG2 Meeting #119, S2-171027, Feb. 13-17, 2017, 7 pages.

Co-Pending EP Application No. 18770806.0, Article 71(3) Communication dated Feb. 1, 2023, 7 pages.

IP Office Australia, Examination Report No. 1 for Australian Application No. 2021273540, dated Dec. 9, 2022, 7 pages.

ZTE et al, "Proposed architecture alignments of Network Slicing Conclusion with 5G Core Overall Architecture in TS 23.501" SA WG2 Meeting #119 S2-171027, Feb. 13-17, 2017, Dubrovnik, Croatia (revision of S2-17xxxx) 7 pages.

3GPP "Technical Specification Group Services and System Aspects; System Architecture for the 5G System" 3GPP TS 23.501 V0.3.0 (Feb. 2017), 97 pages.

3GPP "Technical Specification Group Services and System Aspects; Procedures for the 5G System" 3GPP TS 23.502 V0.2.0 (Feb. 2017), 71 pages.

Co-Pending EP Application No. 18770806.0, Article 97(1) Communication dated Jun. 9, 2023, 3 pages.

Co-Pending EP Application No. 23173352.8, Extended European Search Report dated Jun. 19, 2023, 3 pages.

3GPP "Technical Specification Group Services and System Aspects; Procedures for the 5G System;" 3GPP TS 23.502 V0.2.0 (Feb. 2017) Stage 2; (Release 15) 71 pages.

Telecom Italia, et al. "Network Slice Repository Function (NSRF)" SA WG2 Meeting #120 Mar. 27-31, 2017, Busan, Korea, S2-171744; 17 pages.

ITRI "Interaction between AMF and NRF for handling of NSSAI" SA WG2 Temporary Document SA WG2 Meeting #119, Jan. 13-17, 2017, Dubrovnik, Croatia, 6.5.2 Access Control, RM and CM functions and flows NexGen/Rel-15 , S2-171196, 5 pages.

IP Office Australia, Examination Report No. 3 for Australian Application No. 2021273540, dated Nov. 22, 2023 6 pages.

IP Office Australia, Second Examination Report No. 1 for Australian Application No. 2021273540, dated Oct. 6, 2023 4 pages.

ITRI, "Interaction between AMF and NRF for handling of NSSAI" SA WG2 Meeting #119 S2-171196, Jan. 13-17, 2017, Dubrovnik, Croatia (revision of S2-17xxxx), 5 pages.

IP Office Australia, Notice of Acceptance for Australian Application No. 2021273540, dated Dec. 5, 2023 3 pages.

Office Action for Canadian Application No. 3057328, dated Feb. 27, 2024, 4 pages.

* cited by examiner

NETWORK SLICING SERVING FUNCTION

CROSS REFERENCE TO RELATED APPLICATIONS

This application is a divisional of and claims priority to U.S. patent application Ser. No. 16/577,548, filed on Sep. 20, 2019, which is a continuation of and claims priority to International Patent Application No. PCT/US2018/023435, filed on Mar. 20, 2018, which claims the benefit of priority of U.S. Provisional Patent Application No. 62/473,760, filed on Mar. 20, 2017. The entire content of the before-mentioned patent applications is incorporated by reference as part of the disclosure of this document.

TECHNICAL FIELD

This document relates to systems, devices and techniques for wireless communications, including next generation network architecture.

BACKGROUND

Efforts are currently underway to define next generation communication networks that provide greater deployment flexibility, support for a multitude of devices and services and different technologies for efficient bandwidth utilization.

SUMMARY

This document describes technologies, among other things, for providing a serving function for network slice resources to user devices in a wireless communication network.

In one example aspect, a network function, called network slicing serving function (NSSF) for a public land mobile network (PLMN) is disclosed. The network function has the knowledge of the network-wide access and mobility management (AMF), the NSSF implements slice-level service mapping for a given slice-specific Network Slice Selection Assistant Info (S-NSSAI) and selects a target network slice instance (NSI) based on one or more operational parameters. The NSSF identifies slice level policy for network slices. The NSSF collects slice-level statistics from AMF of its serving PLMN and supports NSSF's operation.

In another example aspect, a wireless communication system is disclosed in which the NSSF is implemented as a separate entity in the network. The NSSF may communicate with other network entities via an interface called Nnssf.

In yet another example aspect, a network function repository function (NRF) that includes the NSSF is disclosed. The NRF provides the NSSF function and further provides an isolation between network slices.

In yet another example aspect, a procedure for registering a user equipment (UE) in a mobile network is disclosed. The procedure includes receiving a network topology, and based on the network topology, determining a set of network slice instances available in the UE's registration area, and deciding whether to assign serving the UE to a new serving AMF, and causing a current serving AMF to cache information from the NSSF for future use.

In yet another example aspect, a network function that assigns a mobility function for serving network slice instances to a user device is discloses. The network function stores a mapping between a pool of the mobility functions and a set of core network slice instances being served by the pool, and selectively updating the mapping based on UE mobility or a change in an operator policy or a topology of the mobile network.

In yet another example aspect, a method for establishing a packet data unit (PDU) session for a UE is disclosed. During the establishing of the packet data session, a mobility function uses locally cached information about a UE's context and determines its ability to serve the UE. If the mobility function is not able to serve the UE, the task of serving the UE is handed over to a second mobility function.

In yet another example aspect, a network architecture that supports network slicing roaming in a mobile network that uses home routing is disclosed.

In yet another example aspect, a PLMN architecture is disclosed. The PLMN includes an entry point NRF that is a designated entry point for communication with another PLMN's entry point NRF and exchanges messages to manage a single connection point for carrying NRF look-ups between the PLMNs.

In some embodiments, the NSSF function may be implemented by an apparatus that includes a memory, a processor and at least one network interface, wherein the processor reads instructions from the memory and implements the NSSF function.

In some embodiments, the disclosed NSSF may be embodied as processor executable code and stored on a computer-readable program medium.

In one example implementation, a method for facilitating operation of a wireless device in a wireless communication network includes receiving, at a network slice selection function in a communication network, a network slice instance request message indicative of a configured network slice selection assistance information for a user device is presently configured, a subscribed network slice selection assistance information for which the user device has subscribed, and an identity of a registration area that the user device is associated with, and transmitting, in response to the network slice request message, a response message that includes information about allowed network slice instances for the user device. A network slice corresponds to a virtual logical network that is optimized for at least one network service. The allowed network slice instances comprise network slice instances from the registration area that are available for the user device.

In another example implementation, a method for facilitating establishment of a packet data session for a user device includes receiving a verification request from a mobility function in a core network of a communication network, the verification request identifying the user device, a current registration area of the user device and a network slice assistance information requested by the user device for establishing the packet data session, and transmitting a response to the mobility function identifying a network slice instance available for the network slice assistance information requested by the user device.

In another example implementation, a method of wireless communication includes receiving by a network device in a wireless network a request for a data session from a user device, the data session request identifying an identification for the user device and a target data network for the data session.

In yet another example implementation, a method of communication, performed in a communication network a first and a second PLMNs includes operating an entry point function in the first PLMN at a logical level above a first plurality of slice level repository functions in the first PLMN to receive resource look-up requests from a second plurality of slice level repository functions in the second PLMN, and communicating with the first plurality of slice level repository functions in the first PLMN to generate a response for the resource look-up requests.

In yet another example implementation, a method implemented by a user device includes registering for operation in the wireless network using network slice assistance information for which the mobile device is configured, and indicating a target set of network services that the mobile device wants, receiving a set of allowed network slice assistance information and a session identification, and performing further communication in the wireless network using the set of allowed network slice assistance information and the session identification.

In yet another example implementation, a method for providing network services to a mobile device operating in a visited network includes receiving, by a mobility function in the visited network, from the mobile device, a message identifying requested network slice assistance information and an identification of the mobile device, obtaining identification of a session management function in a home network for the mobile device, wherein the obtaining is performed querying a network repository function in the home network for the mobile device with the requested network slice assistance information, and acting as a peer-to-peer interface for relaying the another set of resource look-up requests to a single entry point function in the second PLMN.

In yet another example implementation, a method, implemented by a user device includes registering for operation in the wireless network using network slice assistance information for which the mobile device is configured, and indicating a target set of network services that the mobile device wants, receiving a set of allowed network slice assistance information and a session identification, and performing further communication in the wireless network using the set of allowed network slice assistance information and the session identification.

In yet another example implementation, a method for providing network services to a mobile device operating in a visited network includes receiving, by a mobility function in the visited network, from the mobile device, a message identifying requested network slice assistance information and an identification of the mobile device, selecting a session management function serving the visited network, and providing identification of a network repository function in a home network for the mobile device and the requested network slice assistance information to the session management function serving the visited network for the session management function serving the visited network to look up a session management function in the home network for the mobile device.

The details of one or more implementations are set forth in the accompanying attachments, the drawings, and the description below. Other features will be apparent from the description and drawings, and from the claims.

BRIEF DESCRIPTION OF THE DRAWINGS

Like reference symbols in the various drawings indicate like elements.

DETAILED DESCRIPTION

The evolution to the 5G is work in progress. One 5G system network solution is to evolve the 5G system to support Network Slicing. The architectural purpose of network slicing is to leverage the network function virtualization network management technique to enable more efficient logical network implementation to support variety of emerging next generation network services. It is expected that the next generation 5G network services will impose vast diverse and conflicting system requirements towards 5G system such that, it is impossible for operators to deploy one-size-fits-all network solutions. Therefore, network slicing the operator's network deployment enables more cost effective and optimized network solutions to support variety of next generation 5G network services.

The present document discloses, among other things, a network-side function, called the network slice serving function (NSSF), that can be implemented to support the use of network slice instances in future mobile networks. As further described herein, the NSSF may be implemented as a separate functional entity (e.g., dedicated hardware platform(s)), or may be included with another existing network function such as the network repository function (NRF).

Figure 1:
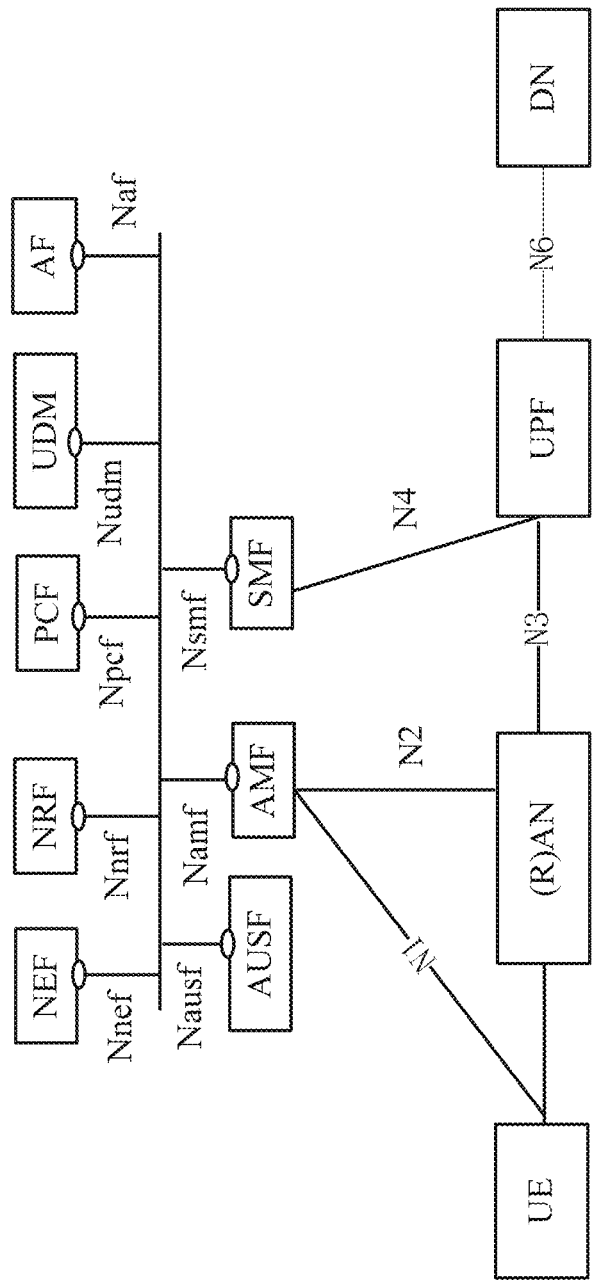
FIG. 1 shows an example non-roaming 5G system architecture using a Service-based representation.

FIG. 1 shows an example non-roaming 5G system architecture using Service-based representation.

Figure 2:
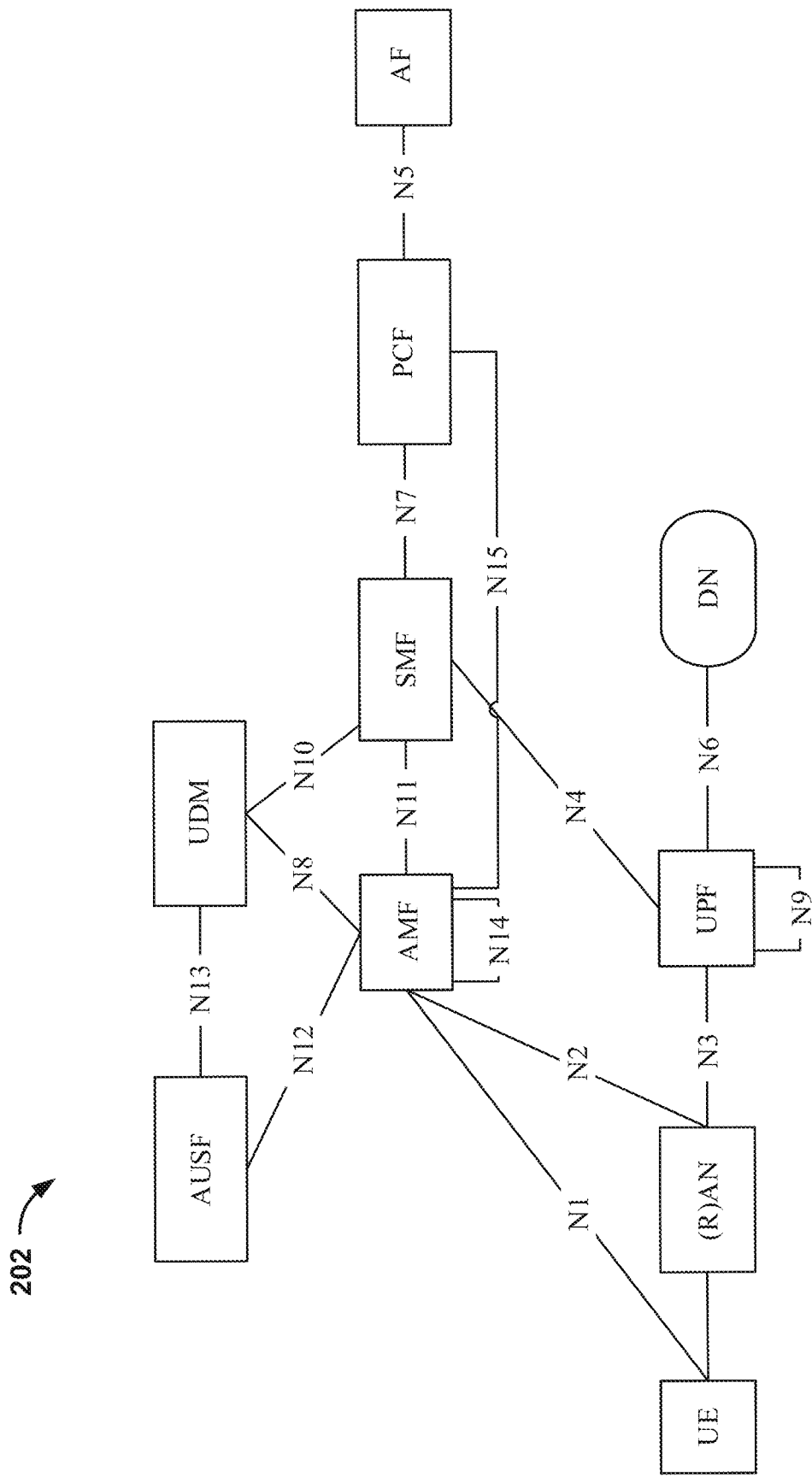
FIG. 2 shows an example non-roaming 5G system architecture using a Reference point-based representation.

FIG. 2 shows an example non-roaming 5G system architecture using Reference point-based representation.

The rectangle boxes in FIG. 1 and FIG. 2 represent the network functions (NFs) that were defined for 5G system as documented in TS 23.501. The key set of network functions are:

Authentication Server Function (AUSF)
Core Access and Mobility Management Function (AMF)
Data network (DN), e.g. operator services, Internet access or 3rd party services
Structured Data Storage network function (SDSF)
Unstructured Data Storage network function (UDSF)
Network Exposure Function (NEF)
NF Repository Function (NRF)
Policy Control function (PCF)
Session Management Function (SMF)
Unified Data Management (UDM)
User plane Function (UPF)
Application Function (AF)
User Equipment (UE)—may include a mobile device or a user device
(Radio) Access Network ((R)AN)
Network Slice Selection Function (NSSF), as disclosed in the present document.

More details on the definitions of each network functions shall refer to TS 23.501, which is incorporated by reference in its entirety.

Figure 3:
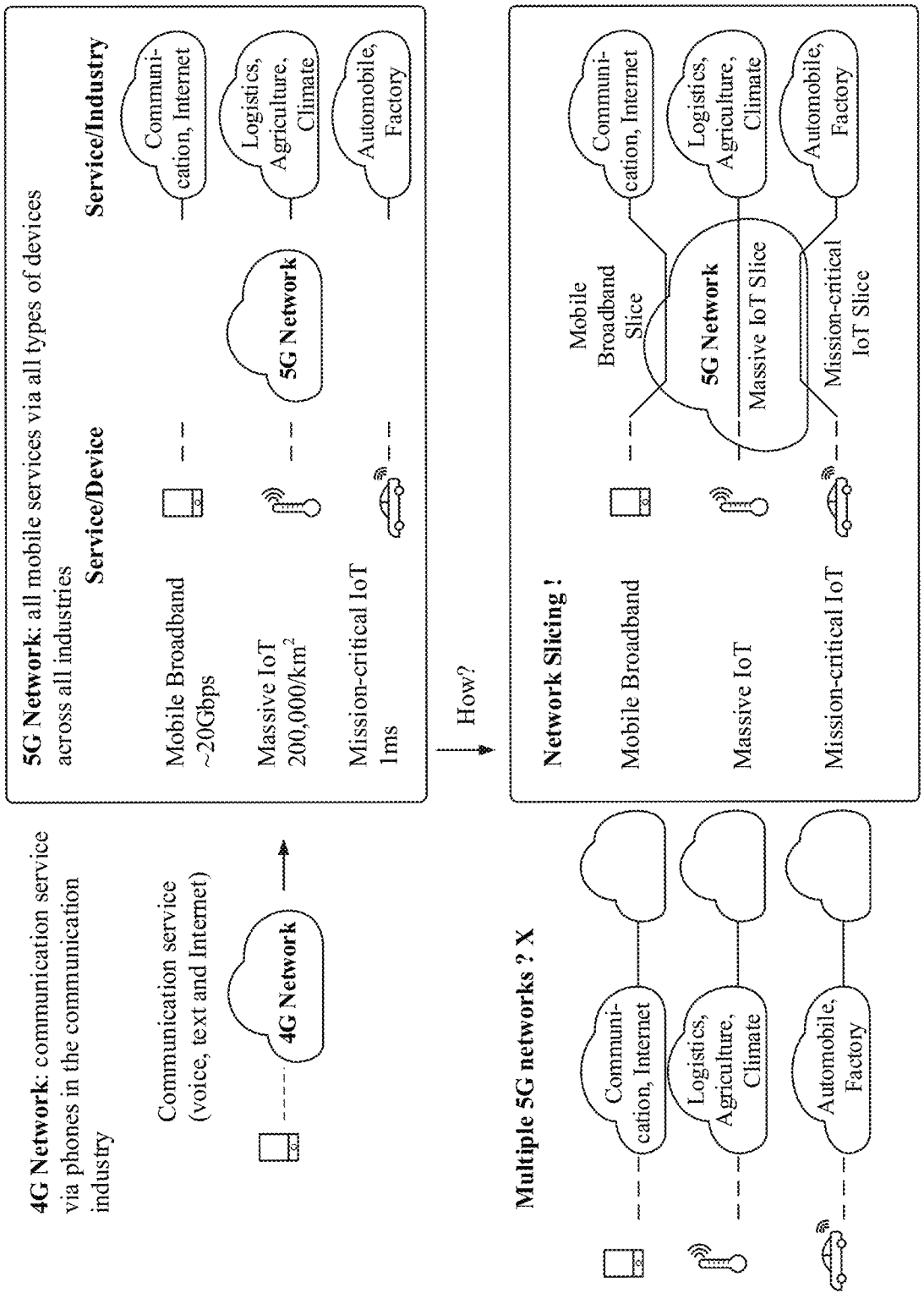
FIG. 3 show an example implementation of Network Slicing for network optimization for specialized network services.

FIG. 3 show an example implementation 300 of Network Slicing for network optimization for specialized network services. As depicted in FIG. 3, today's 4G networks that offer communication service via phones (e.g., voice, text, internet), will evolve into a 5G network in which all mobile services via all types of devices may be offered. For example, mobile phones and tablets may operate at large bitrates such as 20 Gbps, while in some areas, networks may operate with a large density of wireless devices, such as Internet of Things (IoT) configurations with 200,000 or more devices per square kilometer. At the same time, quick response and mission critical applications such as autonomous driving, which require responses times of the order of 1 msec or less, may also be supported by the 5G network infrastructure. To enable such a wide range of configurations and services, and offering connectivity to various industries such as communications/internet, logistics, agricultural, climate, automobiles and factory settings, an architecture that uses network slices has been proposed. Using network slices, the right level of network resource may be allocated to a particular mobile device, in order to meet the desired service requirements. Such network slices may include, for example, large bandwidth slices, high density slices, mission critical slices, and so on.

Figure 4:
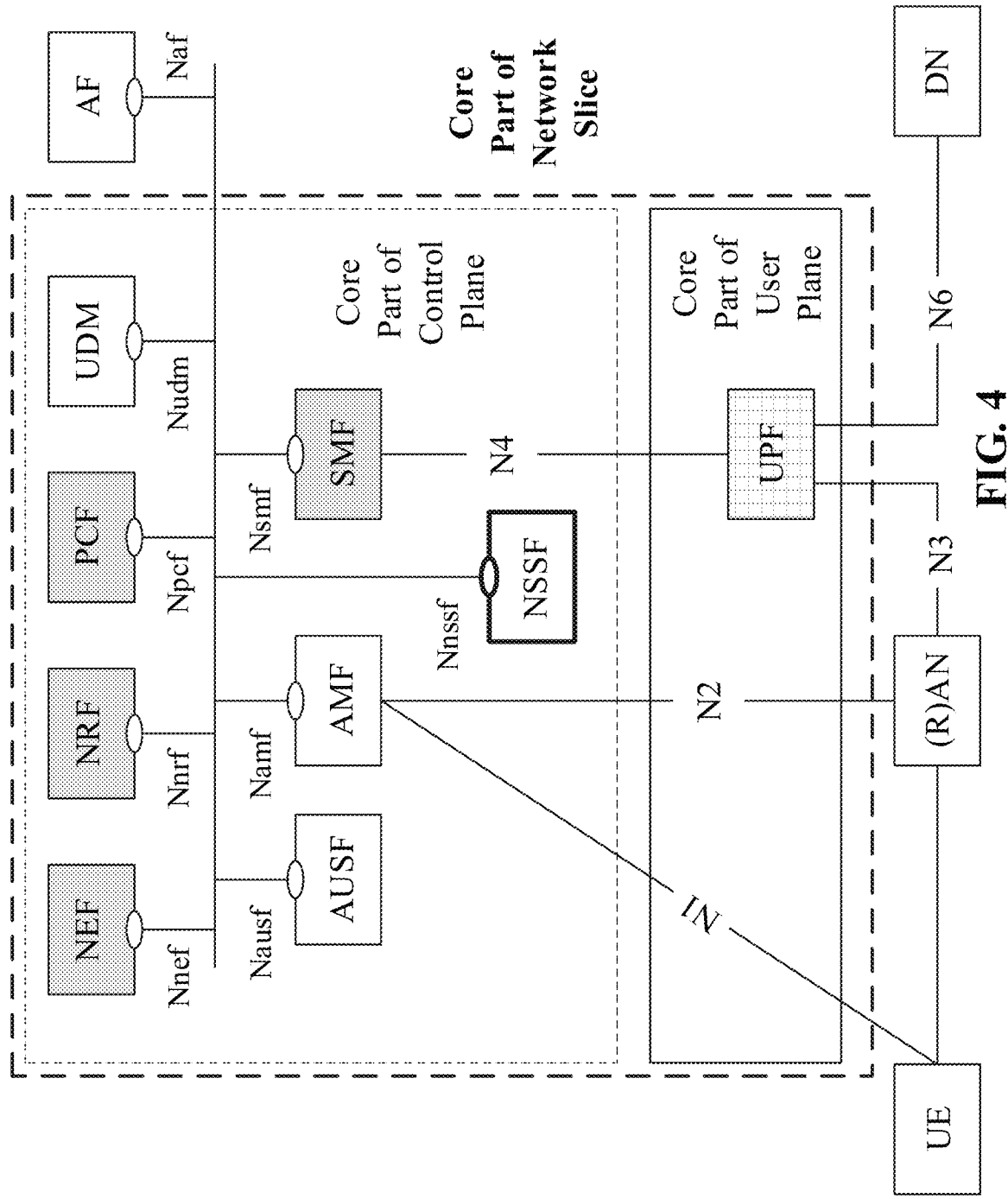
FIG. 4 shows an example of a non-roaming 5G system architecture with network slicing support—Service-based Representation.

FIG. 4 shows an example of a non-roaming 5G system architecture with network slicing support using a service-based Representation. The various architectural blocks are similar to as described in FIG. 1 and FIG. 2. Notably, an additional functional block, called the NSSF, is included in FIG. 4. Various embodiments and aspects of this network function are described in the present document.

Figure 5:
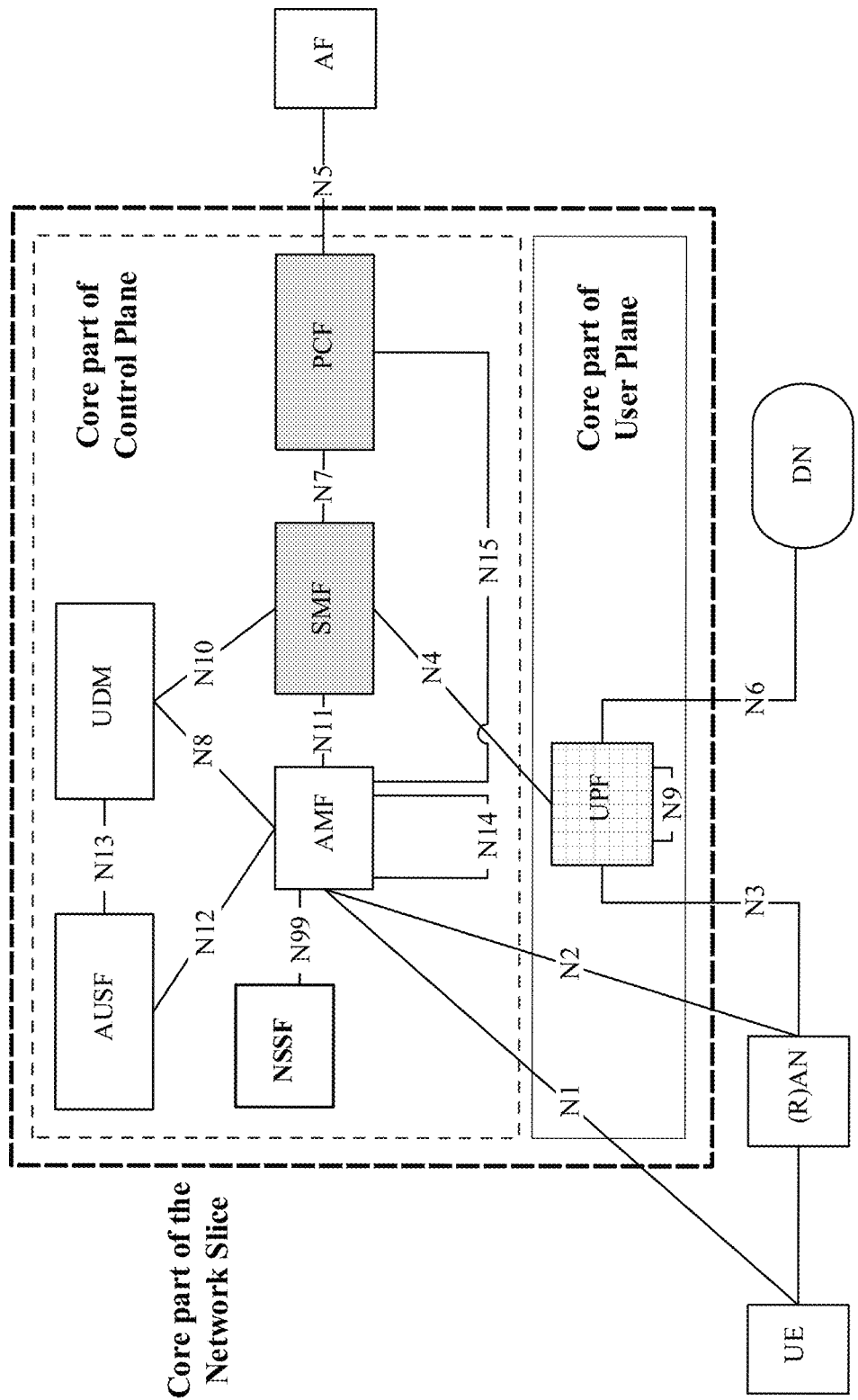
FIG. 5 shows an example of a non-roaming 5G system architecture with network slicing support—Reference point-based Representation.

FIG. 5 shows an example of a non-roaming 5G system architecture with network slicing support using a reference point-based Representation. The above-mentioned NSSF is described in the core part of the control plane, which is a core part of a network slice.

In some embodiments, a network function, called network slicing serving function (NSSF) for a public land mobile network (PLMN) may be implemented. The network function has system-wide knowledge of the topology mapping of Core Network Part network slice instance (NSI) to access and mobility management (AMF) for a given PLMN, the NSSF implements service mapping for a given slice-specific Network Slice Selection Assistant Info (S-NSSAI) and selects a target instance of a network slice based on one or more operational parameters. The NSSF identifies slice level policy for network slices. The NSSF collects slice-level statistics from AMF of its serving PLMN and supports NSSF's operation.

This document describes a next generation 5G mobile system architecture that includes a new network function referred as Network Slicing Serving Function (NSSF) to support the network slice instance (NSI) selection in both RAN sharing and non-sharing virtual environment. The NSSF is a part of the 5G core network function and it interfaces with the operator's management system that controls and manages the NSIs according to the operator defined network slice profile that specifies the required end-to-end system resources, infrastructure, performance and service requirements to support specific target set of services.

3GPP has been working on the next generation 5G system architecture and they are captured in the two forms as shown in FIG. 1 and FIG. 2—traditional reference point based and new service based representations. However, the details on the network slicing architecture on the 5G system have not been fully addressed. When network slicing is supported over the 5G system, it will be organized into network slices operating as the virtual logical network which is optimized to support one or more set of network services. As described before, FIG. 3 presents the concept of network slicing.

The notions of the two architecture representations are as follows:

A service-based representation, where network functions (e.g. AMF) within the control plane enables other authorized network functions to access their services. This representation also includes point-to-point reference points where necessary.

A reference point representation, focusing on the interactions between pairs of network functions described by point-to-point reference point (e.g. N11) between any two network functions (e.g. AMF and SMF) is depicted when some interaction exists between these two network functions.

Prior to network slicing can be deployed over the 5G system, 5G operator needs to develop the network slice template by leveraging the Network Function Virtualization (NFV) management technique to manage the target service. A network slice template defines the setup of the slice, including the system components that need to be instantiated, the features to enable, configurations to apply, resource assignments and all associated workflows, including all aspects of the life cycle (such as upgrades and changes). The template contains machine-readable parts which support automation. Leveraging cloud technologies means that multiple slices with different service properties are still able to run over a common set of resources. Furthermore, all virtualized network functions execute over a common pool of hardware and common infrastructure/platform software.

When operator deploys the target network service(s), identified by one or more S-NSSAI(s), in instance of network slice (NSI) is instantiated according to the network slice template. The virtualized part of the network slice instance which is comprised of a cooperating set of Virtual Network Functions (VNFs) would be instantiated via NFV orchestration platform according to the slice template, while the non-virtualized part would be created and configured by the non-virtualized management environment.

Once the NSI becomes available, it can then operate as a logical network to serve its subscribers. In 3GPP 5G system, it is expecting a given subscriber's device (i.e. UE) could be associated with more than one NSI to access multiple network services simultaneously.

This document discloses a new network function referred as Network Slicing Serving Function (NSSF) to support UE attachment to the network slice instance (NSI) over a 5G virtualized system which may or may not be RAN sharing. The NSSF is part of the 5G core network function and it interfaces with the operator's NFV service orchestration management system that controls and manages the life cycle of the NSI according to the network slice template on the specified end-to-end system resources, infrastructure, performance and service requirements.

Further details on the design of NSSF are described in the following sections. Section headings are used only to improve readability, and do not limit the scope of described technology only to the corresponding sections.

I. Brief Summary

In the sections below, a functional overview of the network slice selection function is provided. The various aspects are highlighted by using two examples for both roaming and non-roaming mobile devices in a communication network. One example relates to the initial registration of a mobile device (UE) in a registration area. The other example relates to the various steps performed when a mobile device requests a data session.

II. NSSF Functional Overview

NSSF implementations may include one or more of the following functionalities.

It is a network function which has the overall knowledge of the system-wide mapping of the AMF to Core Part NSI topology for a given PLMN.

For example, the NSSF may recognize the availability of the set of active NSI(s) corresponding to the registration areas and for which entry point (i.e. AMF) that is accessible to the specific set of NSI(s) and the corresponding serving NRF(s)

It may be noted that having AMF/AMF pool to serve every single NSI across the system's registration areas is NOT a scalable deployment in order to maintain consistent AMF to Core Part NSI mapping topology and configurations across all AMF/AMF pool. As a result, AMF/AMF pool should be organized to support the specific set of NSI(s) that are catered for particular network service deployment.

The NSSF may also support slice-level service mapping for a given S-NSSAI to select the target NSI by taking into account of the serving MNO, Service or OTT providers, UE's location, time window etc.

It identifies the slice-level policy for the slices which are specified by the PLMN. For example, a network slice for the mission-critical service must get higher priority than the other eMBB slice; or rejecting UE eMBB slice service if there is an existing UE associated "active" NSI for mission critical which has higher priority.

It collects slice-level related statistic from AMF for its serving PLMN (e.g. collecting the number of UEs being assigned to a particular NSI) to support slice management operation (e.g. scale in/out)

III. Example of 5G System Architecture with NSSF Support

There are two options for the system architecture to support NSSF.

III.A. Option-1: Introducing a Separate New Logical Network Function

In this option, a new logical network function entity, i.e. NSSF, is added to the 5G system. Roaming and non-roaming 5G system architecture in both the service-based and the reference point-based representations can be described as follows:

For the service-based architecture, new service based interface Nnssf is introduced to support the NSSF functionality that were described above.

For the reference point based architecture, new reference points N99 is introduced to support the NSSF functionality that were described above.

III.B. Option-2: Integrate NSSF into NRF that is Operating Above the Slice Level In this option, generally, there is no change of existing architecture. However, a new function, called a hierarchical NRF, of which the top level of NRF serves at the system level supporting not only the discovery and selection of the network function that is operated above the slice level, but also supporting the NSSF's functionality as described earlier, is added to the existing architecture.

The second level of the NRF is operating at the slice level which supports the discovery and selection of the network function within the slice. With this approach, it can support network function isolation between network slices which is important requirement for network slicing support—i.e. slice isolation.

IV. NSSF Operation Overview

The following describes the overview of the operations of the NSSF during the UE registration and data session establishment.

One building block is the Network Slice Selection Assistant Info (NSSAI). NSSAI is a collection of Slice specific NSSAIs (S-NSSAIs). S-NSSAI may include two pieces of information:

Slice type or referred as Slice Service Type (SST) which is used to identify a specific type of network slice, and Slice Differentiator (SD) which is used to identify a specific slice for a given slice/service type.

In addition, the set of network functions are referred to support the functional descriptions of how NSSF operates to support UE registration and PDU session establishment during non-roaming and roaming scenarios.

IV.A. NSSF Operation During UE Access Registration

Figure 6:
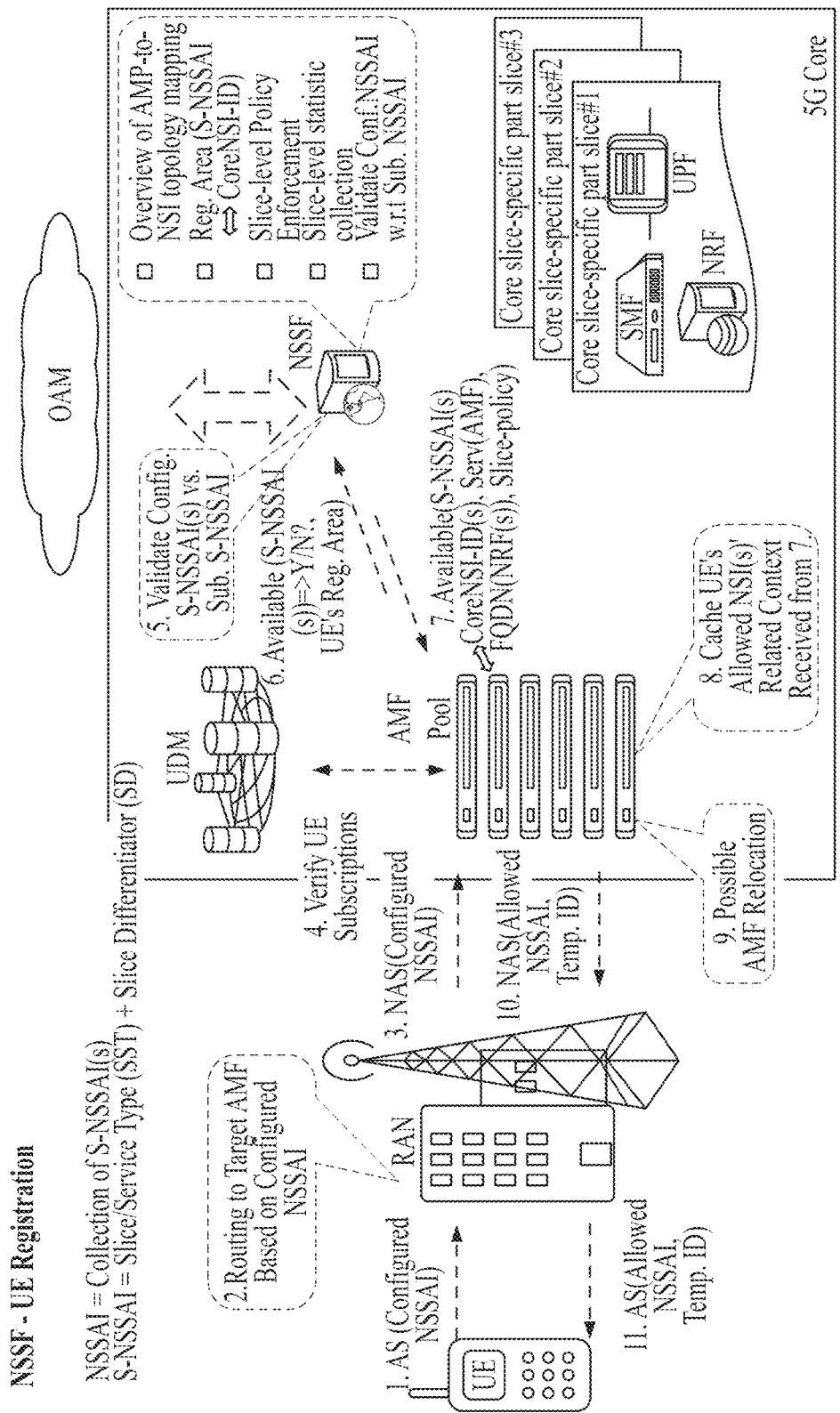
FIG. 6 shows an example of messages exchanged for NSSF operation during UE access registration.

FIG. 6 describes the NSSF operation during the UE registration when accessing to the 5G mobile network.

1. UE registers with the 5G system with the configured NSSAI which was configured by the UE's home PLMN and is used to indicate the target set of network services that the UE would be interested in.

2. & 3. 5G Access Network (e.g. 5G RAN) interprets the NSSAI info provided by the UE in order to route the UE's registration request to the target AMF or a pool of AMFs (i.e. AMF pool) together with the configured NSSAI info. If 5G Access Network does not recognize the NSSAI, the UE's registration request will be routed to the default serving AMF or AMF pool.

4. The selected serving AMF consults with the UDM on the UE's subscription to verify what are the set of S-NSSAI (s) that the UE has subscribed for.

5. & 6. The serving AMF will then pass on both the configured and the subscribed S-NSSAI(s) to the NSSF together with the UE's assigned registration area. NSSF examines both sets of S-NSSAI(s) and determines what are the allowed S-NSSAI(s) for the UE.

Based on the AMF to Core Network Slice Instance (NSI) mapping topology that was provided by the operator's OAM system (e.g., the UE's serving PLMN), the NSSF then determines the set of mapping Core NSI(s) at the UE's registration area that are available to serve the UE. The set of available Core NSI(s) are corresponding to the entire or the subset of the S-NSSAI(s) that were provided to the NSSF, and such final corresponding set of S-NSSAI(s) determined by the NSSF is referred as allowed NSSAI. In addition, the NSSF may determine a new serving AMF that is better to serve the UE for the target set of available NSI(s).

7. NSSF responds to the current serving AMF with the set of available Core NSI(s) that is mapped to the allowed NSSAI (e.g., the set of allowed S-NSSAIs), the new serving AMF (e.g., identified by the IP address or fully qualified domain name FQDN), one or more serving NRFs (e.g., identified by the IP addresses or FQDNs) which serve the corresponding available Core NSIs, and any additional slicing related policy (e.g. serving priorities among the available NSI(s) etc.).

8. The current serving AMF will cache all these info provided by the NSSF as part of the UE's context.

9. If a new serving AMF is indicated by the NSSF, the current serving AMF triggers the AMF relocation by coordinating with the 5G Access Network (e.g. 5G RAN) to recognize the new AMF as the serving AMF. The current serving AMF will also pass on the UE's context to the new serving AMF.

10. The serving AMF will then inform the 5G Access Network for the allowed NSSAI (i.e. the set of S-NSSAIs that are mapped to the NSIs which are available to serve the UE at the UE's registration area) and also the identifier of the serving AMF (i.e. Temp ID) for the given UE.

11. The 5G Access Network also relay the final allowed NSSAI and the Temp ID to the UE, and the UE will store the info for later data session request for service activation.

IV.B. NSSF Notification to AMF on the NSI Topology or Policy Update

In some embodiments, a given AMF/AMF pool is dedicated to a specific set of Core NSIs to support the target S-NSSAIs. NSSF is aware of which AMF serves which set of Core NSI(s). If the Core NSI topology or policy is changed by the operator's OAM system for the corresponding S-NSSAI, then, the AMF/AMF pool mapping to the Core NSI(s) will also be updated in the NSSF with the changes. NSSF will propagate the update to the affected AMF or AMF pool.

Two possible approaches for the NSSF to update the AMF or AMF pool for the topology or policy changes:
  NSSF pushes the topology update to the AMF or AMF pool, or
  AMF or AMF pool pull the topology status periodically from the NSSF based on periodic timer set topology check.

As a result of the AMF to Core NSI mapping topology change, either the given AMF/AMF pool continues to serve the same Core NSI or no longer to serve the same Core NSI.

IV.C. NSSF Operation During UE PDU Data Session Establishment

Figure 7:
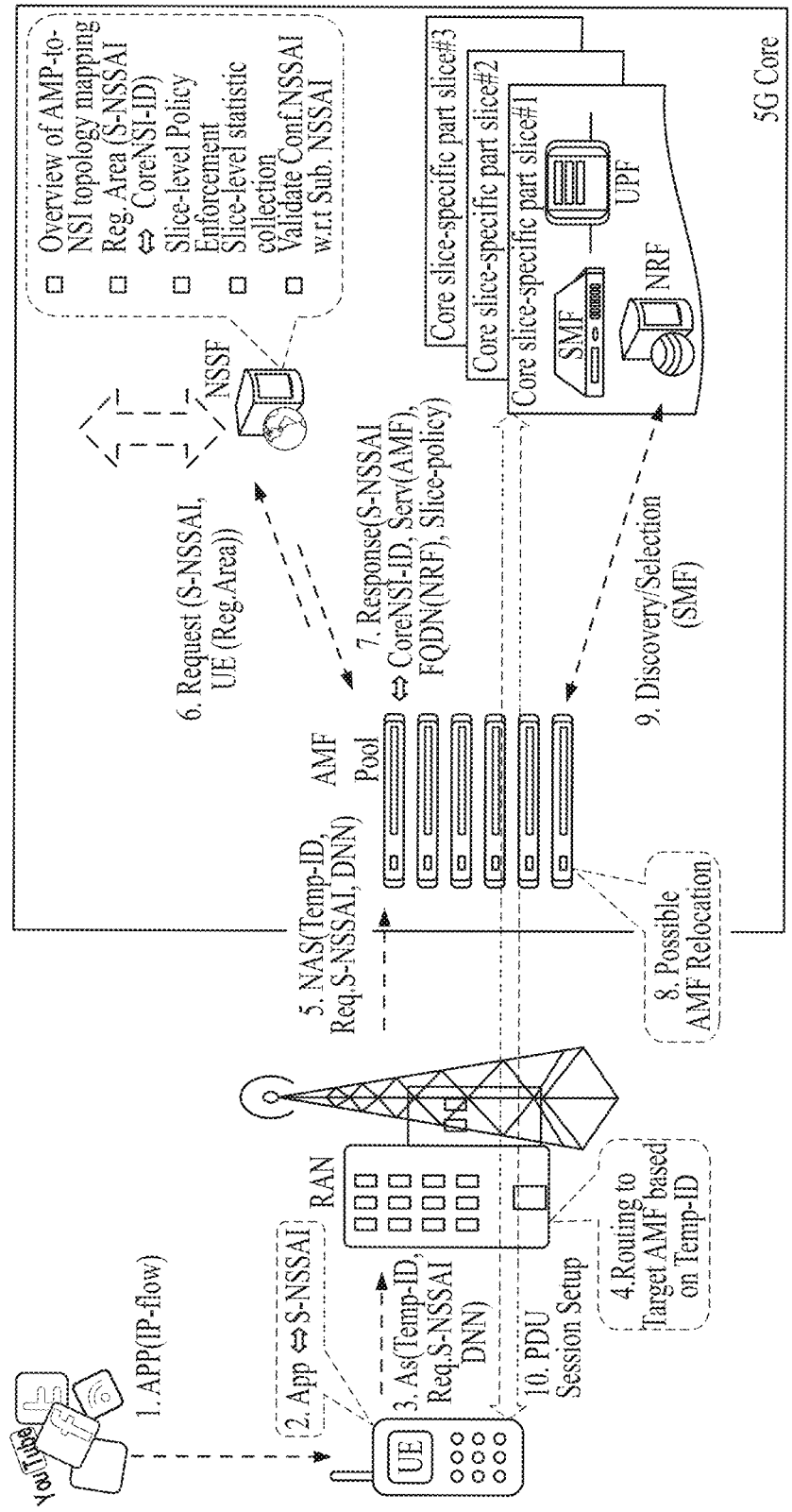
FIG. 7 shows an example of messaged exchange for NSSF operation during UE data session establishment.

FIG. 7 describes the NSSF operation during the UE initiation for the PDU data session establishment (i.e. network service activation) over the 5G mobile network.

1. & 2. Application layer service activation triggers UE to perform service mapping to the allowed S-NSSAI.

3. UE initiates the data session request with the 5G system with the requested S-NSSAI, Temp-ID and the target data network (i.e. DNN).

4. & 5. 5G Access Network (e.g. 5G RAN) interprets the Temp-ID provided by the UE in order to route the UE's data session request to the target serving AMF or AMF pool together with the requested S-NSSAI info and DNN. If 5G Access Network does not recognize the Temp-ID, the UE's data session request will be routed to the default serving AMF or AMF pool.

6. By referring to the cached UE's context, if the current serving AMF or AMF pool detects that it is no longer serve the Core NSI corresponding to the requested S-NSSAI (e.g. due to the Core NSI topology change), the serving AMF should verify with the NSSF with the requested S-NSSAI based on UE's current registration area to determine the new target Core NSI and/or the new AMF to serve the UE.

Otherwise, skip this step-6 to 8 below and go to step-9.

7. The NSSF determines the new AMF to Core NSI mapping that is corresponding to the requested S-NSSAI at the UE's registration area, and possible the revised allowed S-NSSAI to replace the old allowed S-NSSAI (i.e. replacing the requested S-NSSAI). In addition, the NSSF may determine a new serving AMF that is better to serve the UE for the mapping NSI.

The NSSF then respond to the serving AMF with the AMF to Core NSI mapping (e.g., identified by the Core NSI ID) for the requested S-NSSAI, the possible new accepted S-NSSAI (i.e. replacement of the requested S-NSSAI) and the new serving AMF (i.e. identified by the IP address or FQDN), the serving NRF (i.e. identified by the IP address or FQDN) and any additional slicing related policy (e.g. serving priorities among the available NSI(s) etc.).

8. If a new serving AMF is indicated by the NSSF, the old serving AMF triggers the AMF relocation by coordinating with the 5G Access Network (e.g. 5G RAN) to recognize the new AMF as the serving AMF.

9. The serving AMF updates the UE's context and queries the serving NRF to discover and to select the proper SMF that serves the for the upcoming data session.

10. The serving AMF triggers the PDU data session establishment procedure with the newly selected SMF as requested by the UE. Upon the successful data session establishment, the latest Temp-ID and the latest accepted S-NSSAI will also be responded to the UE.

IV.D. Network Slicing Roaming Support via NSSF

IV.D.1. During the UE's Registration (Home Routed Case)

Figure 8:
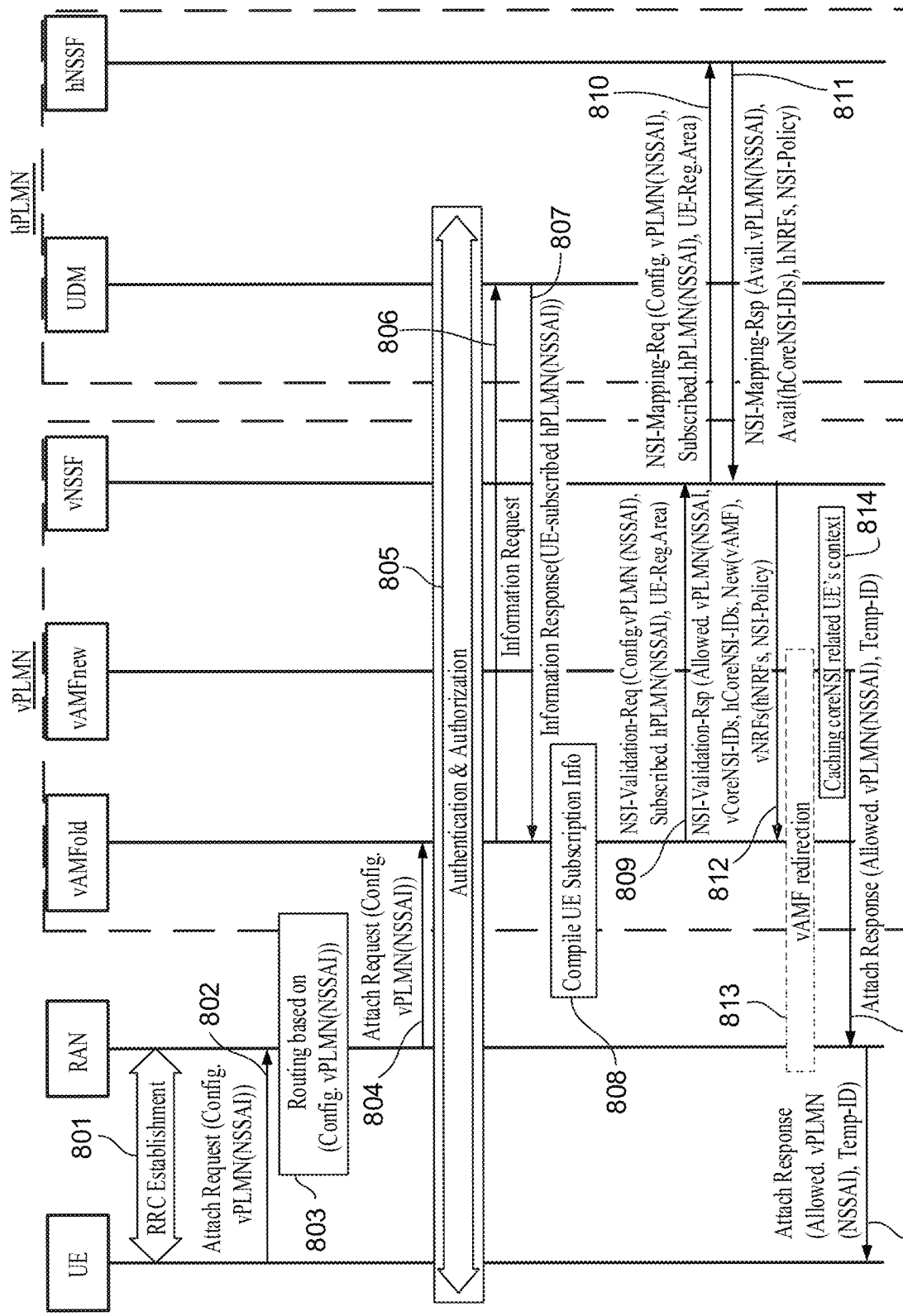
FIG. 8 shows an example implementation for NSSF home-routed roaming support during UE registration.

FIG. 8 describes the UE registration during the network slicing roaming scenario, more specifically for the home routed case.

Steps 1., 2. & 3.: UE presents the "configured" NSSAI (referred as vPLMN(NSSAI)) that was provisioned for the target serving vPLMN to the RAN which refers to the NSSAI to route the registration request to selected serving vAMF.

4.: vAMF receives the UE's registration request and triggers the UE's authentication with the home UDM (hUDM).

5. vPLMN and hPLMN proceed with the UE's authentication.

6. & 7: Upon successful UE's authentication, serving AMF obtains the UE's subscribed NSSAI from hUDM (referred as hPLMN(NSSAI)).

8. & 9.: vAMF compiles the configured and subscribed NSSAI info from both UE and its home network and present them (e.g., vPLMN(NSSAI) and hPLMN(NSSAI)) as well as the UE's registration area to the vNSRF to determine the "allowed" NSSAI to be used at the serving vPLMN.

10. & 11.: vNSSF communicates with the hNSSF to determine the availability of the "allowed" NSSAI for the serving UE in the hPLMN and the corresponding home core part of the NSIs (i.e. identified by the home Core NSI IDs). hNSSF also provides the vNSSF for the address of the corresponding home NRF (i.e. denoted as hPLMN(NRFs)) that serves the target NSI(s) to support the hPLMN network function selection and discovery.

12.: Based on the UE's registration area and the "allowed" NSSAI (including the related the CoreNSI ID), vNSSF determines the vNRF and the possible new target vAMF as well as other necessary slice-level control policy.

13.: If new vAMF was indicated by the vNSSF, old serving vAMF triggers AMF redirection. Otherwise, skip this step and go to step 14.

14., 15. & 16.: Serving AMF caches all the slicing related context (received from 12 above) for the UE and responds to the UE for the "allowed" NSSAI as well as the Temp ID.

IV.D.2. During the PDU Session Establishment (Home Routed Case)

1: UE presents the "requested" NSSAI as well as the Temp ID to the RAN which is eventually routed to the serving vAMF in the vPLMN.

2: (Assuming that the UE is still in the same registration area) vAMF refers to the vNRF with the S-NSSAI to select the vSMF. As for the selection of the hSMF, there are two possible options.

Figure 9:
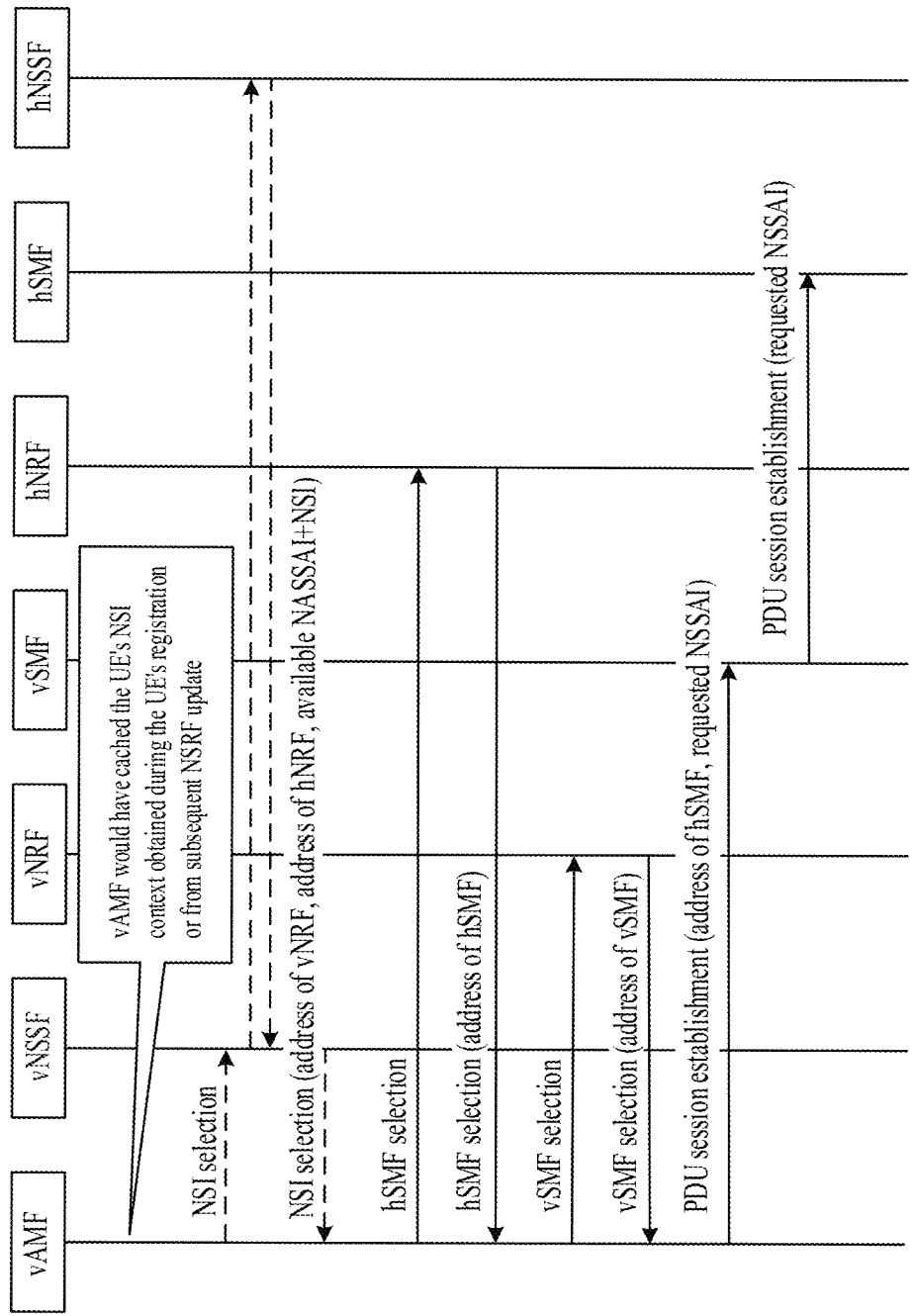
FIG. 9 shows an example architecture of vAMF looks up from the hNRF for hSMF.

Option-1: vAMF looks up from the hNRF with the S-NSSAI to identify the hSMF and then, vAMF pass the hSMF info to the vSMF (shown in FIG. 9).

Figure 10:
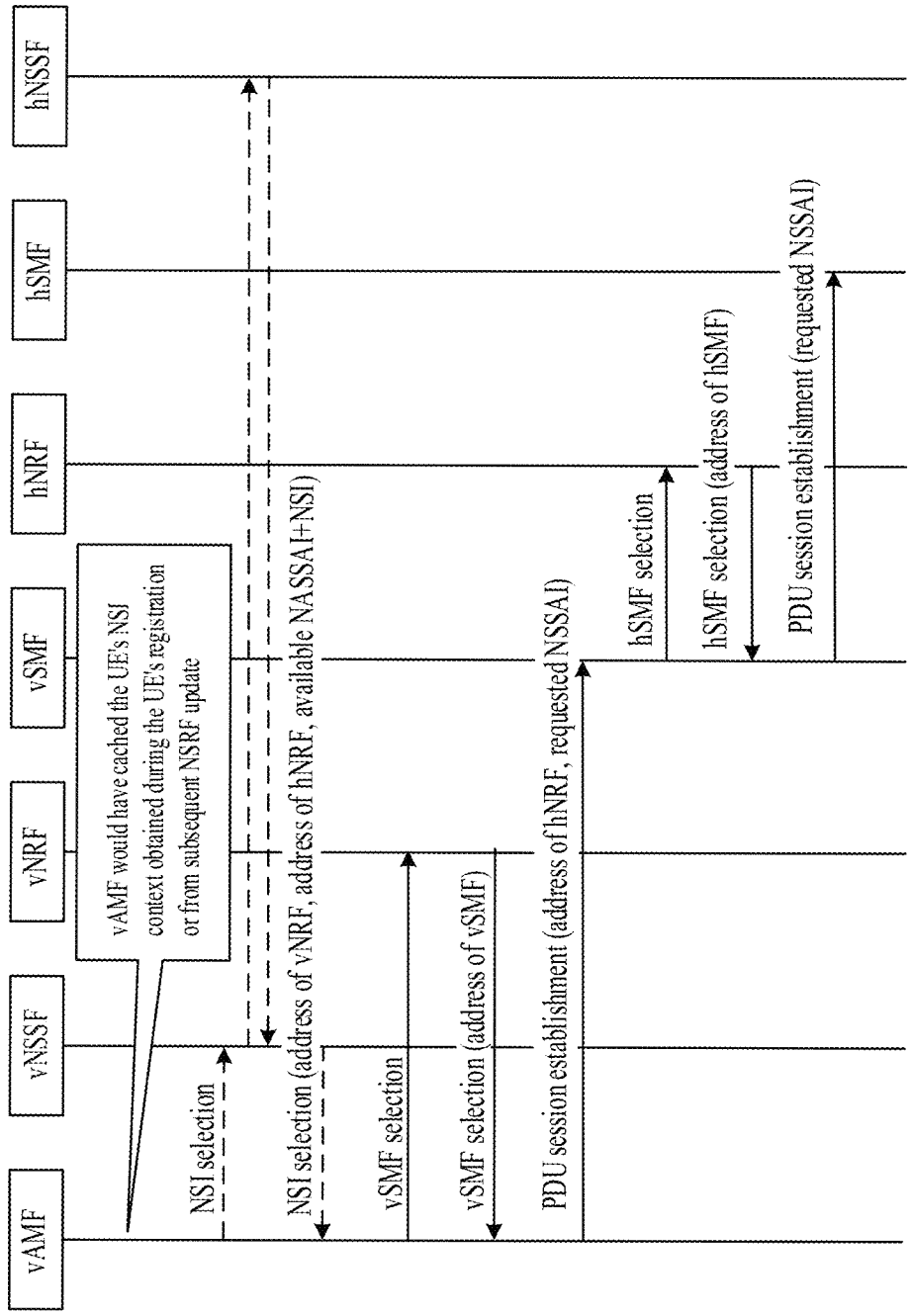
FIG. 10 shows an example architecture of vSMF looks up from the hNRF for hSMF.

Option-2: Once the vAMF selects the vSMF, vAMF passed on the hNRF and S-NSSAI info to the vSMF, then, the vSMF does the look up from the hNRF to select the hSMF (procedure depicted in FIG. 10).

IV.D.3. Roaming Hierarchy NRF Look-Up Optimization

Due to the privacy consideration, slice-level NRF look-up should be limited to the network function (NF) which is belonged to the same NSI. In the case of the roaming scenario, there will be multiple network functions from the vPLMN (i.e. vNFs) to refer to the hNRF to look up for the home network function belonged to the same NSI that it needs to communicate with.

Figure 11:
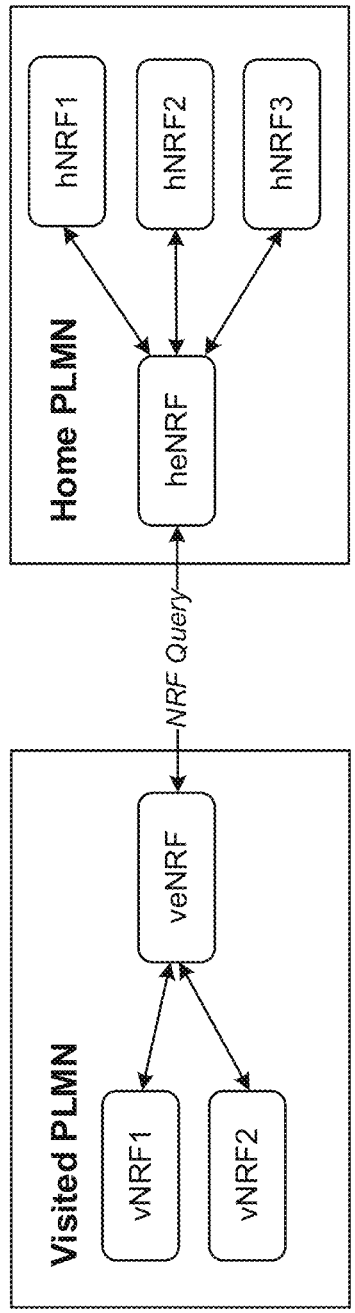
FIG. 11 shows an example of a hierarchy network repository function (NRF) look-up.

In order to reduce the amount of peer-to-peer roaming interface interconnections, this document introduces a designed entry point NRF (i.e. veNRF or heNRF) in both the visited and home PLMNs. The prefix "v" and "h" are used to indicate network functions and entities in a user device's visited network and home network. The veNRF and heNRF are above slice-level NRF based on the hierarchy structure of the NRF, to relay the NRF look up. When the NF from the vPLMN performs their NRF look up, the slice-level NRF will relay the request towards the veNRF, which will then communicate with the heNRF to relay such look up to the slice-level hNRF. FIG. 11 describes the hierarchy NRF look up concept.

In some embodiments, a wireless communication system in which the NSSF is implemented as a separate entity in the network may be implemented. The NSSF may communicate with other network entities via an interface called Nnssf.

In some embodiments, a network function repository function (NRF) that includes the NSSF may be implemented. The NRF provides the NSSF function and further provides an isolation between network slices.

In some embodiments, a procedure for registering a user equipment (UE) in a mobile network may be implemented by a network-side server. The procedure includes receiving a network topology, and based on the network topology, determining a set of network slice instances available in the UE's registration area, and deciding whether to assign serving the UE to a new serving AMF, and causing a current serving AMF to cache information from the NSSF for future use.

In some embodiments, a network function that assigns a mobility function for serving network slice instances may be implemented. The network function stores a mapping between a pool of the mobility functions and a set of core network slice instances being served by the pool, and selectively updating the mapping based on UE mobility or a change in an operator policy or a topology of the mobile network.

In some embodiments, a method for establishing a packet data unit (PDU) session for may be implemented. During the establishing, a mobility function uses locally cached information about a UE's context and determines its ability to serve the UE. If the mobility function is not able to serve the UE, the task of serving the UE is handed over to a second mobility function.

In some embodiments, a network architecture that supports network slicing roaming in a mobile network that uses home routing may be implemented.

In some embodiments, a PLMN includes an entry point NRF that is a designated entry point for communication with another PLMN's entry point NRF and exchanges messages to manage a single connection point for carrying NRF look-ups between the PLMNs.

In some embodiments, the NSSF function may be implemented by an apparatus that includes a memory, a processor and at least one network interface, wherein the processor reads instructions from the memory and implements the NSSF function.

In some embodiments, the disclosed NSSF may be embodied as processor executable code and stored on a computer-readable program medium.

Some embodiments may be described based on the following examples.

Example 1: A method implemented by an apparatus operating in a public land mobile network (PLMN), includes acquiring knowledge of access and mobility management (AMF) in the PLMN, implementing slice-level service mapping for a given slice-specific Network Slice Selection Assistant Info (S-NSSAI), selecting a target network slice instance (NSI) based on one or more operational parameters, identifying slice level policy for network slices, and collecting slice-level statistics from AMF of its serving PLMN and supports an NSSF's operation.

Example 2: The method of Example 1, wherein the one or more operational parameters include an identity of a serving network operator, an identity of a service provider that is providing a requested service, location of a user equipment that is requesting a given network slice instance, a time of day, or a network resource availability.

Example 3: The method of Example 1, wherein the apparatus of Example 1 is implemented as a separate entity in the mobile network, and the apparatus communicating with other entities in the network via a per-defined communication interface.

Example 4: The method Example 1, further including implementing a network function repository by the apparatus of Example 1.

Example 5: The method of Example 4, further including implementing a logical isolation between network slices.

Example 6: A method of registering a user equipment in a mobile network includes receiving, at a network server, information about network topology of the mobile network, determining, based on the network topology, a set of network slice instances available in a user equipment's (UE) registration area, deciding to selectively assign serving the UE to a new serving mobility function, and causing a current serving mobility function to cache information about the UE's context for future use.

Example 7: A method of assigning a mobility function for serving network slice instances, comprising storing a mapping between a pool of the mobility functions and a set of core network slice instances being served by the pool, and selectively updating the mapping based on UE mobility or a change in an operator policy or a topology of the mobile network.

Example 8: A method for establishing a PDU session for a user equipment (UE) operating in a wireless communication network includes determining, by a first mobility server from a pool of network-side servers, during the establishing, using locally cached information about the UE's context ability of the network-side server to serve the UE, and selectively handing over serving the UE to a second mobility function server in the pool based on the determining, when the first mobility server is not able to serve the UE.

Example 9: A method of providing network slicing roaming in a mobile network that uses home routing includes receiving, from a user equipment (UE), a registration request comprising the UE's network slice instance assistant information (NSSAI), authenticating the UE for operation in the mobile network, determining one or more allowed NSSAI from the configured NSSAI, and assigning a mobility function to serve the UE based on the determining.

Example 10: The method of Example 9, wherein the determining the one or more allowed NSSAI includes exchanging messaging with a network slice serving function in the UE's home network.

Example 11: A method of providing network slicing roaming in a mobile network that uses home routing includes receiving, from a user equipment (UE) operating in a visited network, a PDU session establishment request comprising the UE's requested network slice instance assistant information (NSSAI); looking up, from a mobility function in the visited network, a set of NSSAI from the UE's network slice serving function in the UE's home network; and passing information from the looking up to a serving mobility function in the visited network.

Example 12: A method of operating a public land mobile network (PLMN), comprising designating an entry point network function repository function (NRF) for communication with another PLMN's entry point NRF, and exchanging messages to manage a single connection point for carrying NRF look-ups between the PLMN and the another PLMN.

Figure 12:
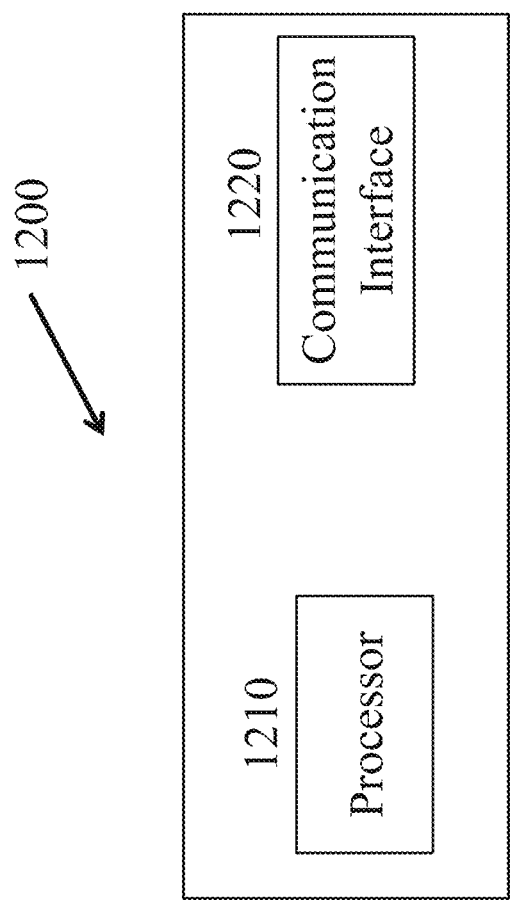
FIG. 12 is a block diagram of an example communication apparatus.

FIG. 12 shows an example hardware platform 1200 that may be used to implement the various architectural blocks described herein. For example, the blocks shown in FIG. 4, FIG. 5, the NSSF, a user device, a mobile device, a mobility function, a repository function, etc. may be implemented using the hardware platform 1200. The hardware platform 1200 may include a processor 1210. The hardware platform 1200 may implement a communication interface 1220 such as the various interfaces shown in FIG. 1 to FIG. 5. The communication interface 1220 may be wired or wireless interface as appropriate. For example, some network functions in the core network may comprise wired communication interface 1220, while user devices or mobile stations may comprise wireless communication interfaces 1220. The processor 1210 may be configured to implement the various techniques described in the present document. In addition, the hardware platform 1200 may be communicatively coupled with other hardware such as storage, database, memory, and so on.

Figure 13:
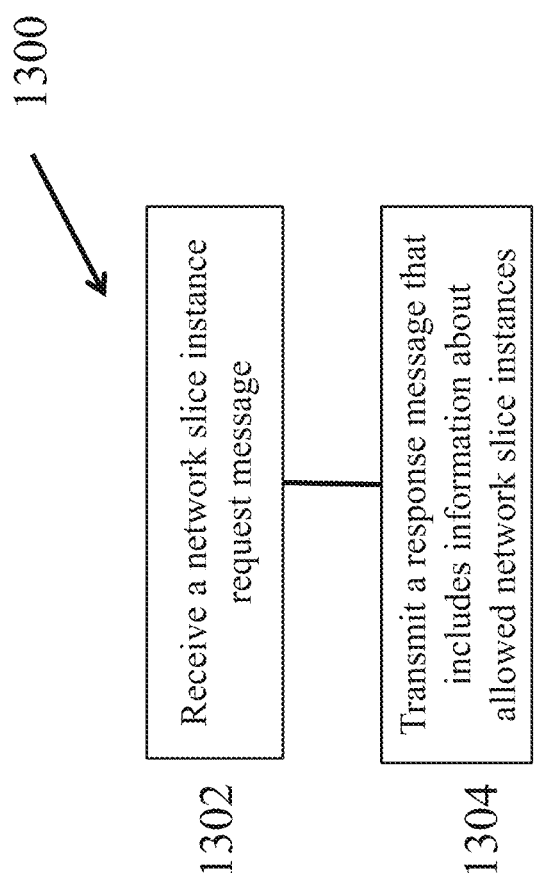
FIG. 13 is a flowchart for an example method of facilitating registration of a mobile device in a communication network.

FIG. 13 is a flowchart for an example method 1300 of facilitating registration of a mobile device in a communication network. The communication network may be, for example, as depicted in FIG. 6. The method 1300 includes receiving (1302), at a network slice selection function (e.g., NSSF) in a communication network, a network slice instance request message indicative of a configured network slice selection assistance information for a user device is presently configured, a subscribed network slice selection assistance information for which the user device has subscribed, and an identity of a registration area that the user device is associated with, and transmitting (1304), in response to the network slice request message, a response message that includes information about allowed network slice instances for the user device. In some examples, a network slice corresponds to a virtual logical network that is optimized for at least one network service. In some examples, the allowed network slice instances comprise network slice instances from the registration area that are available for the user device. For example, at 1302, the message may be transmitted by a mobility function such as the AMF, and received by the network slice selection function. Section IV.A describes some additional features of method 1300.

In some embodiments, the method 1300 may include identifying, in the response message, a new serving mobility function for the user device (see, e.g., Step 7 of Section IV.A). In addition, as described in Section IV.A, in some embodiments, the response message may further include a priority rule related to the allowed network slice instances. For example, a priority rule may specify which ones of available network slice instances has a higher priority for allocation or quality of service.

In some embodiments, the method 1300 may further include storing at the network slice selection function, a mapping between access and mobility functions and network slice instances available in the communication network. The storing may be performed such that the network slice selection stores a system-wide mapping of mobility functions (e.g., AMF) and core part network slice instances for a given communication network such as a PLMN. For example, the mapping includes information about a set of active network slice instances corresponding to registration areas in the communication network, and corresponding access and mobility function that is available for the set of active network slice instances. In addition, in some implementations, network slice instance level policies indicating priority among network slice instances as specified in the communication network (e.g., PLMN) may also be stored. The method 1300 may perform a slice level mapping for a given network slice selection assistance information, using operational parameters such as at least one of the user device's location, a time window, an identify of a service provider for the communication network, and the user device's current serving mobile network operator. As depicted in FIG. 4 and FIG. 5, the network slice selection function may be implemented as a separate network function (e.g., using a separate hardware platform or platforms) that interacts with other network functions using a standardized application programmers interface (API). In some implementations, e.g., as described in Section III.B, the network slice selection function may be implemented by logically partitioning a network repository function into a first level operating above slice-level and configured to perform network level discovery and selection and a second level operating at slice-level and configured to perform slice level discover and selection.

Figure 14:
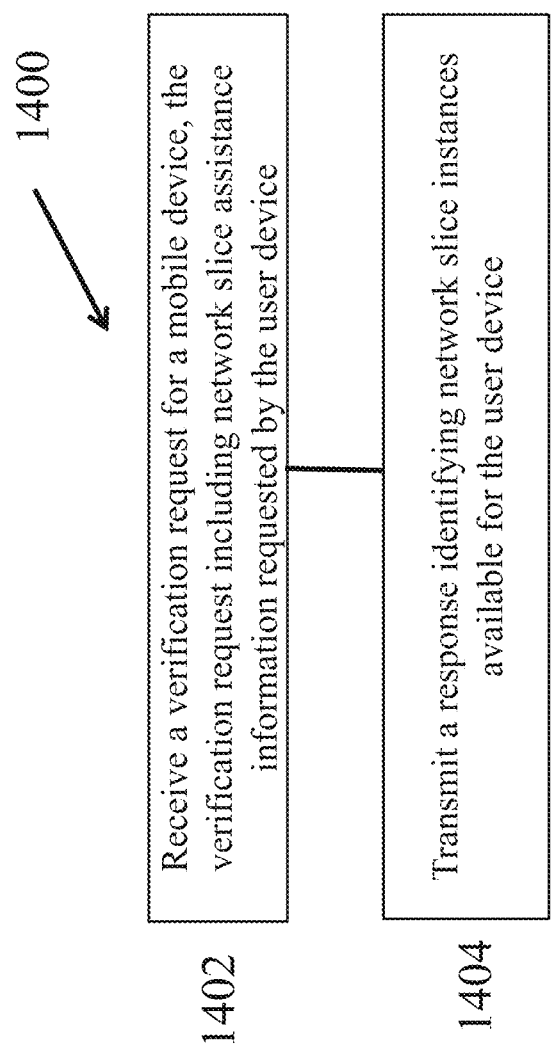
FIG. 14 is a flowchart for an example method for facilitating establishment of a packet data session for a user device.

FIG. 14 is a flowchart for an example method 1400 for facilitating establishment of a packet data session for a user device. For example, one implementation of the method 1400 is described in Section IV.C. The method 1400 includes, receiving (1402) a verification request from a mobility function in a core network of a communication network, the verification request identifying the user device, a current registration area of the user device and a network slice assistance information requested by the user device for establishing the packet data session, and transmitting (1404) a response to the mobility function identifying a network slice instance available for the network slice assistance information requested by the user device. For example, the mobility function may be the AMF. The method 1400 may further include identifying another mobility function that is suitable for serving the user device. The method 1400 may further include identifying, in the response, a slicing policy associated with the network slice instance. The response may further identify a revised allowed network slice assistance information based on the another mobility function, such that the revised network slice assistance information replaces a previous allowed network slice information for the user device.

Figure 15:
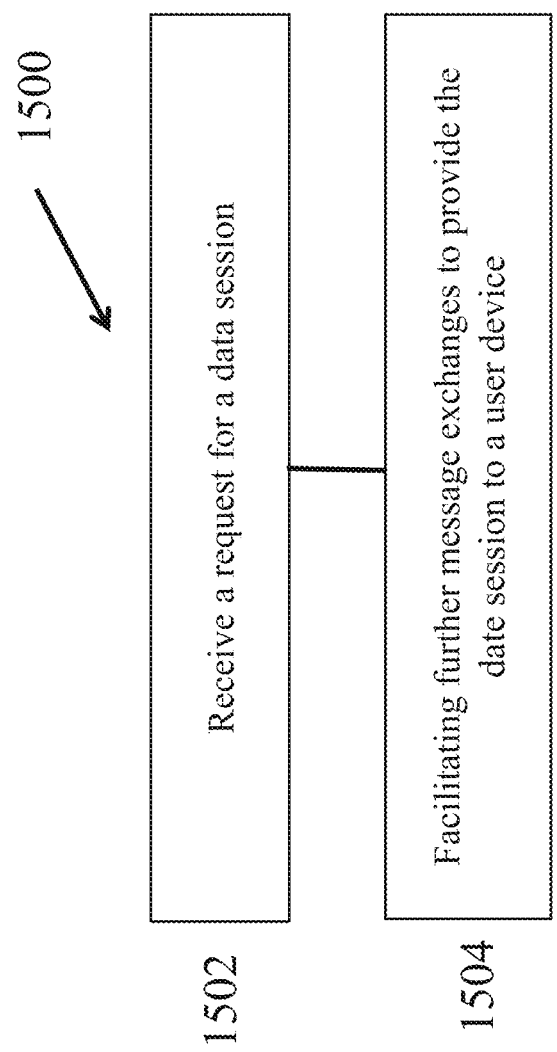
FIG. 15 is a flowchart for an example method of wireless communication session performed during packet data session establishment for a user device.

FIG. 15 is a flowchart for an example method 1500 of wireless communication session performed during packet data session establishment for a user device. The method 1500 includes receiving (1502) by a network device in a wireless network a request for a data session from a user device, the data session request identifying an identification for the user device and a target data network for the data session, and facilitating (1504), further message exchanges in the wireless network for providing the packet data session to the user device. For example, this may include, selectively based on the identification for the user device, one of a default serving mobility function and a current serving mobility function for serving the request for the data session. The identification may be a temporary identification such that different identifications may be used for different packet date establishment sessions.

Figure 16:
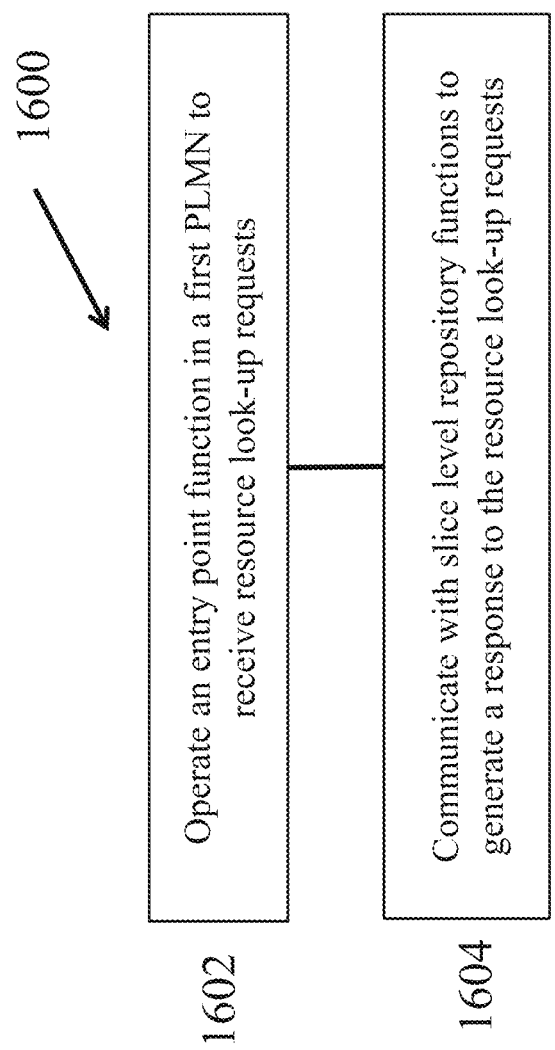
FIG. 16 is a flowchart for an example method of operating an entry point function in a communication network.

FIG. 16 is a flowchart for an example method 1600 of operating an entry point function in a communication network. Section IV.D.3 describes one example embodiment of method 1600. The method 1600 may be implemented in a communication network comprising a first PLMN and a second PLMN. The method 1600 includes operating (1602) an entry point function in the first PLMN at a logical level above a first plurality of slice level repository functions in the first PLMN to receive resource look-up requests from a second plurality of slice level repository functions in the second PLMN, and communicating (1604) with the first plurality of slice level repository functions in the first PLMN to generate a response for the resource look-up requests. In various embodiments, the first and the second PLMNs may be home or visited PLMNs and vice versa.

Figure 17:
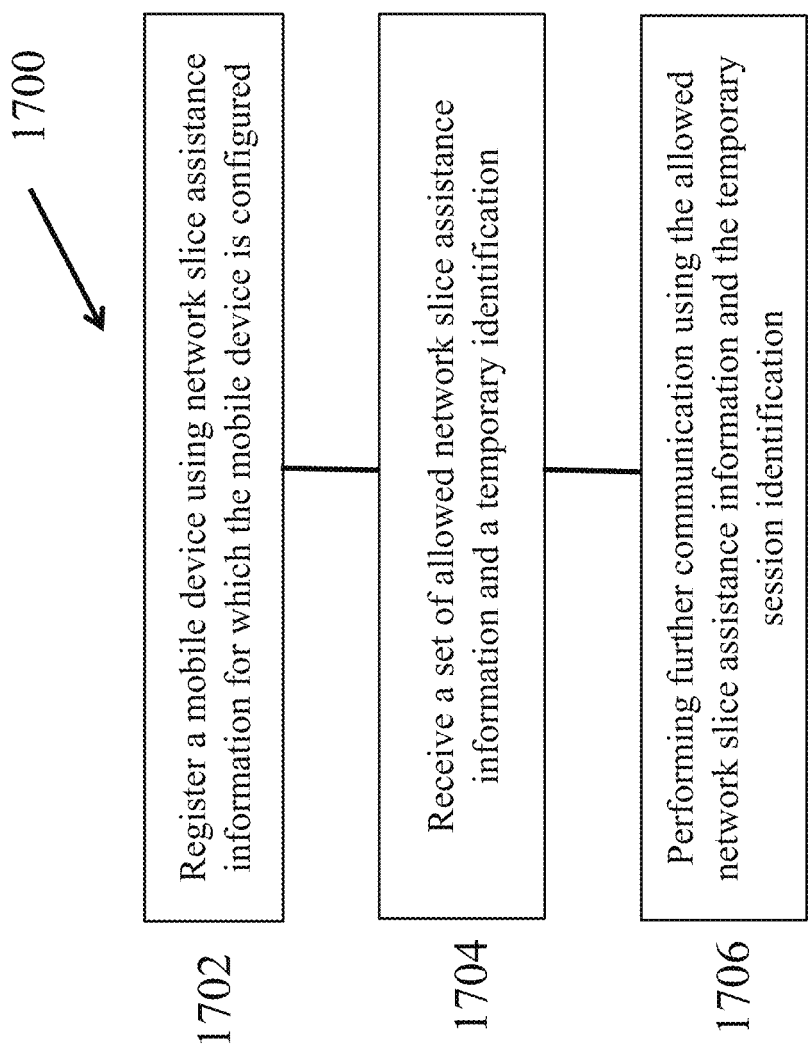
FIG. 17 is a flowchart for an example method of wireless communication implemented by a mobile device.

FIG. 17 is a flowchart for an example method 1700 of wireless communication implemented by a mobile device. Some example embodiments are described in Section IV.A. The method 1700 includes registering (1702) for operation in the wireless network using network slice assistance information for which the mobile device is configured, and indicating a target set of network services that the mobile device wants, receiving (1704) a set of allowed network slice assistance information and a session identification, and performing (1706) further communication in the wireless network using the set of allowed network slice assistance information and the session identification. The mobile device may further map services requested by application level triggers to the allowed network slice instance assistance information, and trigger a data session request in response to the application level triggers by using the mapping.

Figure 18:
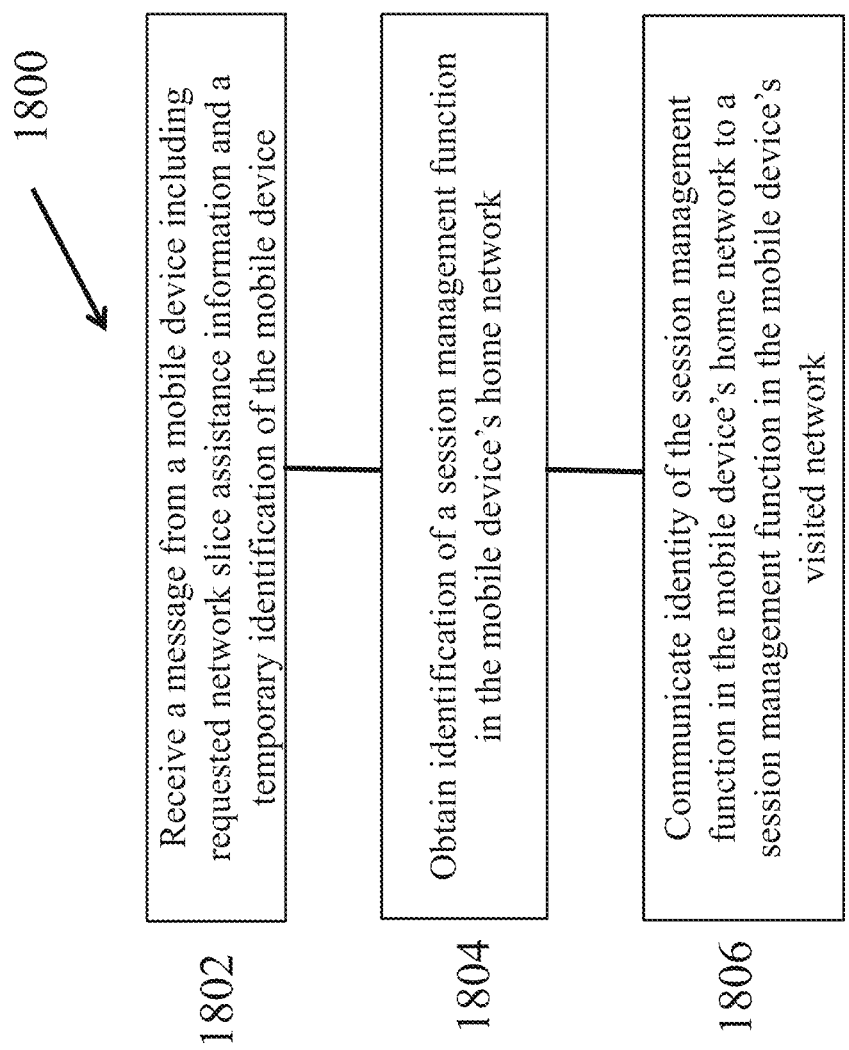
FIG. 18 is a flowchart for an example method for providing network services to a mobile device operating in a visited network.

FIG. 18 is a flowchart for an example method 1800 for providing network services to a mobile device operating in a vested network. The method 1800 includes receiving (1802), by a mobility function in the visited network, from the mobile device, a message identifying requested network slice assistance information and an identification of the mobile device, obtaining (1804) identification of a session management function in a home network for the mobile device, wherein the obtaining is performed querying a network repository function in the home network for the mobile device with the requested network slice assistance information, and providing (1806) the identification of the session management function in the home network to a session management function in the visited network. In some embodiments, the mobility function in the visited network may cache a network slice information context of the mobile device during a registration of the mobile device in the visited network.

Figure 19:
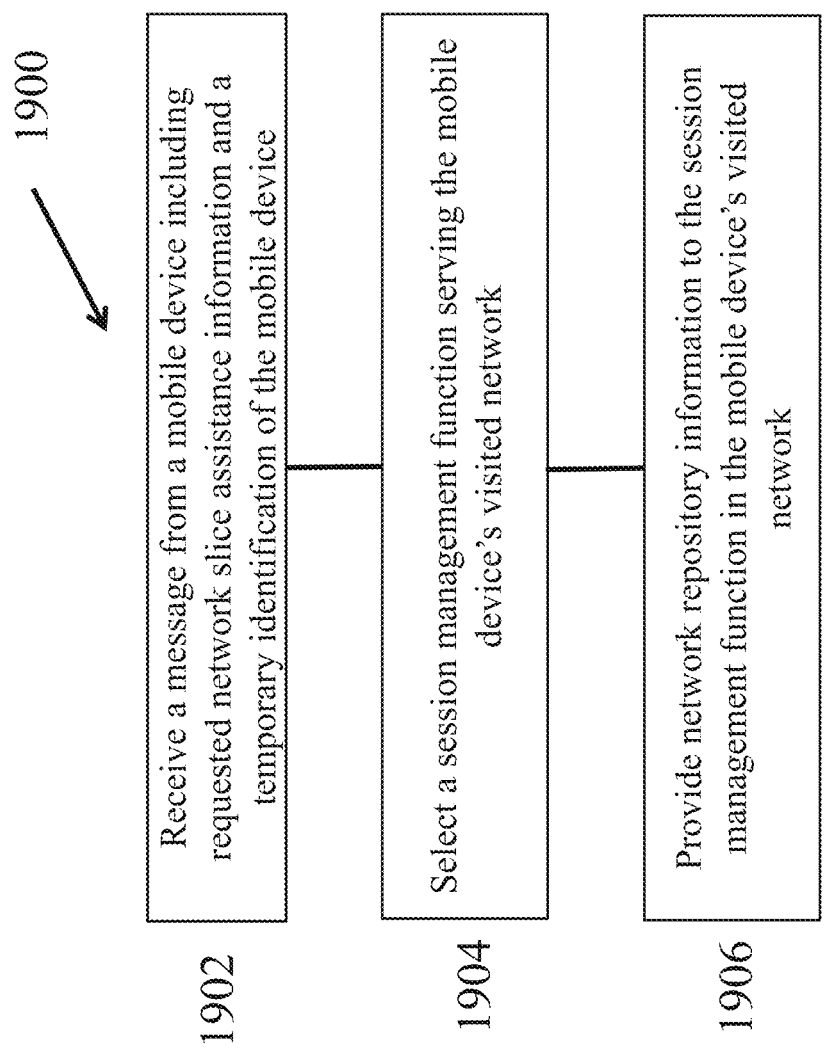
FIG. 19 is a flowchart for another example method for providing network services to a mobile device operating in a visited network.

FIG. 19 is a flowchart for another example method 1900 for providing network services to a mobile device operating in a visited network. The method 1900 may be implemented by a mobility function such as the AMF. The method 1900 includes receiving (1902), by a mobility function in the visited network, from the mobile device, a message identifying requested network slice assistance information and an identification of the mobile device, selecting (1904) a session management function serving the visited network, and providing (1906) identification of a network repository function in a home network for the mobile device and the requested network slice assistance information to the session management function serving the visited network for the session management function serving the visited network to look up a session management function in the home network for the mobile device.

In some embodiments, the mobility function may cache a network slice information context of the mobile device during a registration of the mobile device in the visited network.

It will be appreciated that the present document discloses a new network function called network slice selection function NSSF that can be implemented in the core network of a communication network (e.g., 5G communication network). The NSSF tracks available NSI in a given registration area and coordinates allocation of proper network resources to meet service demands from a user device. The NSSF may achieve the coordination by interacting with the AMF and with NSSF function in the mobile device's visited network.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for providing network services to a mobile device operating in a visited network; comprising:
   receiving, by a mobility function in the visited network, from the mobile device, a message identifying requested network slice assistance information that indicates a corresponding network slice;
   obtaining, by the mobility function in the visited network, from a network repository function in a home network, identification of a session management function in the home network for the mobile device, wherein the obtaining is performed based on a result of querying the network repository function in the home network for the mobile device with the requested network slice assistance information identified in the message;
   providing, by the mobility function in the visited network to a session management function in the visited network, the identification of the session management function in the home network that is obtained by the mobility function in the visited network from the network repository function in the home network, and
   wherein the querying the network repository function in the home network is performed through an entry point in the visited network configured to receive a request for the querying from a network repository function in the visited network and communicate with an entry point in the home network that relays the request to the network repository function in the home network to generate the result of the querying,
   wherein the entry point in the visited network is at a logical level above the network repository function in the visited network and the entry point in the home network is at a logical level above the network repository function in the home network, and
   wherein the method further comprises, before the receiving the message,
   receiving, from a network slice selection function in the visited network, an indication of a new target mobility function in the visited network.

2. The method of claim 1, further including:
   caching, by the mobility function in the visited network, a network slice information context of the mobile device during a registration of the mobile device in the visited network.

3. The method of claim 1, further comprising, before the receiving the message:
   receiving, by the mobility function in the visited network, a registration request from the mobile device, the registration request.

4. The method of claim 1, further comprising, before the receiving the message:

transmitting, by the mobility function in the visited network, to a network slice selection function in the visited network, a validation request that includes a configured network slice selection assistant information presently configured for the mobile device and a subscribed network slice selection assistance information for which the mobile device has subscribed.

5. The method of claim 1, further comprising:
receiving, from a network slice selection function in the visited network, an allowed NSSAI (network slice selection information) during a registration of the mobile device in the visited network.

6. The method of claim 5, wherein the requested network slice assistance information corresponds to the allowed NSSAI.

7. A communication apparatus comprising a processor for providing network services to a mobile device operating in a visited network; wherein the processor operates as a mobility function in the visited network and is configured for:
receiving, from the mobile device, a message identifying requested network slice assistance information that indicates a corresponding network slice;
obtaining, by the mobility function in the visited network, from a network repository function in a home network, identification of a session management function in the home network for the mobile device, wherein the obtaining is performed based on a result of querying the network repository function in the home network for the mobile device with the requested network slice assistance information identified in the message; and
providing, by the mobility function in the visited network to a session management function in the visited network, the identification of the session management function in the home network that is obtained by the mobility function in the visited network from the network repository function in the home network, and
wherein the querying the network repository function in the home network is performed through an entry point in the visited network configured to receive a request for the querying from a network repository function in the visited network and communicate with an entry point in the home network that relays the request to the network repository function in the home network to generate the result of the querying,
wherein the entry point in the visited network is at a logical level above the network repository function in the visited network and the entry point in the home network is at a logical level above the network repository function in the home network, and
wherein the processor is further configured for, before the receiving the message:
receiving, from a network slice selection function in the visited network, an indication of a new target mobility function in the visited network.

8. The communication apparatus of claim 7, wherein the processor is further configured for:
caching, by the mobility function in the visited network, a network slice information context of the mobile device during a registration of the mobile device in the visited network.

9. The communication apparatus of claim 7, wherein the processor is further configured for, before the receiving the message:
receiving, by the mobility function in the visited network, a registration request from the mobile device, the registration request.

10. The communication apparatus of claim 7, wherein the processor is further configured for, before the receiving the message:
transmitting, by the mobility function in the visited network, to a network slice selection function in the visited network, a validation request that includes a configured network slice selection assistant information presently configured for the mobile device and a subscribed network slice selection assistance information for which the mobile device has subscribed.

11. The communication apparatus of claim 7, wherein the processor is further configured for:
receiving, from a network slice selection function in the visited network, an allowed NSSAI (network slice selection information) during a registration of the mobile device in the visited network.

12. The communication apparatus of claim 11, wherein the requested network slice assistance information corresponds to the allowed NSSAI.

13. A computer program product comprising a computer readable memory having code stored thereupon, the code, when executed, causing a processor to implement a method for providing network services to a mobile device operating in a visited network; comprising:
receiving, by a mobility function in the visited network, from the mobile device, a message identifying requested network slice assistance information that indicates a corresponding network slice;
obtaining, by the mobility function in the visited network, from a network repository function in a home network, identification of a session management function in the home network for the mobile device, wherein the obtaining is performed based on a result of querying the network repository function in the home network for the mobile device with the requested network slice assistance information identified in the message; and
providing, by the mobility function in the visited network to a session management function in the visited network, the identification of the session management function in the home network that is obtained by the mobility function in the visited network from the network repository function in the home network, and
wherein the querying the network repository function in the home network is performed through an entry point in the visited network configured to receive a request for the querying from a network repository function in the visited network and communicate with an entry point in the home network that relays the request to the network repository function in the home network to generate the result of the querying,
wherein the entry point in the visited network is at a logical level above the network repository function in the visited network and the entry point in the home network is at a logical level above the network repository function in the home network, and
wherein the method further comprises, before the receiving the message,
receiving, from a network slice selection function in the visited network, an indication of a new target mobility function in the visited network.

14. The computer program product of claim 13, wherein the method further includes:
caching, by the mobility function in the visited network, a network slice information context of the mobile device during a registration of the mobile device in the visited network.

15. The computer program product of claim 13, wherein the method further comprises, before the receiving the message:
- receiving, by the mobility function in the visited network, a registration request from the mobile device, the registration request.

16. The computer program product of claim 13, wherein the method further comprises, before the receiving the message:
- transmitting, by the mobility function in the visited network, to a network slice selection function in the visited network, a validation request that includes a configured network slice selection assistant information presently configured for the mobile device and a subscribed network slice selection assistance information for which the mobile device has subscribed.

17. The computer program product of claim 13, wherein the method further comprises:
- receiving, from a network slice selection function in the visited network, an allowed NSSAI (network slice selection information).

* * * * *